United States Patent
Itani et al.

(10) Patent No.: US 10,086,485 B2
(45) Date of Patent: Oct. 2, 2018

(54) MACHINE TOOL

(71) Applicant: TOSHIBA KIKAI KABUSHIKI KAISHA, Chiyoda-Ku, Tokyo (JP)

(72) Inventors: Shinya Itani, Mishima (JP); Yutaka Tsukita, Mishima (JP); Hiromi Masuda, Numazu (JP); Hiroshi Uchimura, Shiwa-gun (JP); Mitsunori Kokubo, Numazu (JP)

(73) Assignee: TOSHIBA KIKAI KABUSHIKI KAISHA, Chiyoda-Ku, Tokyo (JP)

( * ) Notice: Subject to any disclaimer, the term of this patent is extended or adjusted under 35 U.S.C. 154(b) by 273 days.

(21) Appl. No.: 15/166,800

(22) Filed: May 27, 2016

(65) Prior Publication Data
US 2016/0346884 A1 Dec. 1, 2016

(30) Foreign Application Priority Data
May 29, 2015 (JP) ................................ 2015-110178

(51) Int. Cl.
*B23Q 3/157* (2006.01)
*B23Q 3/155* (2006.01)
(Continued)

(52) U.S. Cl.
CPC .......... *B23Q 3/1554* (2013.01); *B23B 31/201* (2013.01); *B23Q 3/15713* (2013.01);
(Continued)

(58) Field of Classification Search
CPC ........................... B23Q 3/155–3/15793; B23Q 3/1554–2003/155456; Y10S 483/902
(Continued)

(56) References Cited

U.S. PATENT DOCUMENTS 5,230,685 A * 7/1993 Christen ............ B23Q 3/15713
483/55
5,920,973 A * 7/1999 Kosmowski ....... B23Q 3/15793
29/26 A
(Continued)

FOREIGN PATENT DOCUMENTS

CN 201086132 7/2008
CN 201863032 6/2011
(Continued)

OTHER PUBLICATIONS

Machine Translation of JP 05-285766-A, which JP '766 was published Nov. 1993.*
(Continued)

*Primary Examiner* — Erica E Cadugan
(74) *Attorney, Agent, or Firm* — DLA Piper LLP US

(57) ABSTRACT

A machine tool includes: a spindle head; a spindle rotatably supported on the spindle head; a chuck unit configured to chuck a tool inserted in an axis direction of the spindle; a tool holder configured to hold the tool attached to the chuck unit; and a rotary arm configured to move the tool holder to a reachable position of the spindle. The tool holder is supported on the rotary arm by a support mechanism, and the support mechanism includes a displacement following mechanism configured to support the tool holder on the rotary arm in a manner to be capable of displacing the tool holder in a direction intersecting an axis of the tool.

4 Claims, 13 Drawing Sheets

(51) Int. Cl.
  *B23B 31/20* (2006.01)
  *B23C 1/06* (2006.01)
  *B23B 31/26* (2006.01)
  *B23C 1/00* (2006.01)
  *B23Q 1/01* (2006.01)
(52) U.S. Cl.
  CPC .......... *B23Q 3/15773* (2013.01); *B23C 1/002* (2013.01); *B23Q 1/012* (2013.01); *B23Q 2003/155414* (2016.11); *B23Q 2003/155418* (2016.11); *B23Q 2003/155421* (2016.11); *B23Q 2003/155428* (2016.11); *B23Q 2003/155442* (2016.11); *Y10S 483/902* (2013.01); *Y10T 279/17529* (2015.01); *Y10T 409/307728* (2015.01); *Y10T 409/309464* (2015.01); *Y10T 483/176* (2015.01); *Y10T 483/1776* (2015.01)
(58) Field of Classification Search
  USPC ........................................................ 483/902
  See application file for complete search history.

(56) References Cited

U.S. PATENT DOCUMENTS

| | | | |
|---|---|---|---|
| 6,241,645 B1 * | 6/2001 | Vanhinsbergh | B23Q 3/15506 483/54 |
| 6,929,591 B2 * | 8/2005 | Dilts | B64G 4/00 483/58 |
| 2008/0070768 A1 | 3/2008 | Muser | |
| 2009/0116924 A1 | 5/2009 | Shinano | |
| 2015/0018179 A1 | 1/2015 | Scheffler | |
| 2016/0263717 A1 * | 9/2016 | Garnham | B23Q 3/1554 |

FOREIGN PATENT DOCUMENTS

| | | |
|---|---|---|
| CN | 203599537 | 5/2014 |
| CN | 204019250 | 12/2014 |
| DE | 3532842 | 3/1987 |
| JP | 05-285766 A * | 11/1993 |
| JP | 09-257037 | 9/1997 |
| JP | 2004-237408 | 8/2004 |
| JP | 2009-039792 | 2/2009 |
| JP | 2009-248224 | 10/2009 |
| JP | 5247868 B2 | 7/2013 |
| KR | 100653511 | 11/2006 |
| WO | WO 2010-123135 | 10/2010 |
| WO | WO-2015/061837 A1 * | 5/2015 |

OTHER PUBLICATIONS

Korean Office Action issued in KR Application No. 10-2016-0063991 dated Dec. 12, 2017.
English Language Abstract of KR 100653511 published on Nov. 27, 2006.
Chinese Office Action issued in CN 201610352838.6 dated Oct. 10, 2017.
English Language Abstract of CN 201086132 published on Jul. 16, 2008.
English Language Abstract of CN 201863032 published on Jun. 15, 2011.
English Language Abstract of CN 203599537 published on May 21, 2014.
English Language Abstract of DE 3532842 published on Mar. 26, 1987.
Taiwanese Office Action (with English Translation) issued in TW 105114733 dated Aug. 4, 2017.
English Language Abstract of CN 204019250 published on Dec. 17, 2014.
English Language Abstract of JP 5247868 B2 published on Jul. 24, 2013.
English Language Abstract of WO 2010-123135 published on Oct. 28, 2010.
English Language Abstract and Machine Translation of JP 09-257037 published on Sep. 30, 1997.
English Language Abstract and Machine Translation of JP 2004-237408 published on Aug. 26, 2004.
English Language Abstract and Machine Translation of JP 2009-039792 published on Feb. 26, 2009.
English Language Abstract and Machine Translation of JP 2009-248224 published on Oct. 29, 2009.

* cited by examiner

MACHINE TOOL

The entire disclosure of Japanese Patent Application No. 2015-110178 filed May 29, 2015 is expressly incorporated by reference herein.

TECHNICAL FIELD

The present invention relates to a machine tool. Particularly, the present invention relates to a machine tool for cutting with a high accuracy under a high rotation.

BACKGROUND ART

A typical machine tool (e.g., a machining center) includes a spindle supported on a spindle head and various cutting tools attached to a tip of the spindle and is configured to cut a workpiece by rotating the spindle.

A choice of the various cutting tools depends on details of machining of the workpiece. A standardized holder (e.g., based on BT standard) is used for attaching variously shaped tools to a tip of the same spindle.

Each of the tools is fixed to the standardized holder and a chuck unit in accordance with the holder is provided to the spindle, so that the tools can be attached to the spindle irrespective of the shapes of the tools.

In the machine tool (e.g., the machining center), an automatic tool exchanger is used. The automatic tool exchanger is configured to reliably handle the tools, irrespective of the shapes of the tools, by gripping the standardized holder using a rotary arm and the like (see Document 1: JP-A-2009-39792).

However, in recent years, a machine tool configured to attach the tool to the spindle without using the holder has been used in response to demands for an increase in the speed rotation of the spindle and the accuracy of the machine tool.

For instance, in some machine tools, an air bearing is used for supporting the spindle to achieve a high speed rotation reaching several tens of thousands to several hundreds of thousands of rotation per minute (see Document 2: JP-A-09-257037).

Disadvantage of the above high-speed rotary machine tool is the use of the holder for attaching the tool. For instance, at an insufficient axis alignment accuracy between the tool and the holder fixed to the tool, vibration of the tool during the high speed rotation becomes hard, which is not suitable for the rotation support by an air static pressure bearing. Moreover, the high-speed rotary machine tool, which is often used for a highly accurate machining of fine shapes, is not suitable for being downsized since the machine tool requires the holder.

In such a background, the holder is not used for attaching the tool, but a straight shank of the tool is directly fixed to the spindle.

For instance, as the machine tool in which the tool is directly fixed to the spindle, a machine tool in which the tool is fixed by shrink fit has been developed (see Document 3: JP-A-2004-237408).

Moreover, as the machine tool in which the tool is directly fixed to the spindle, a machine tool in which the rotation support of the tool is separated from the rotation transfer from the spindle and a direct connection portion between the spindle and the tool mainly transfers only the rotation is also proposed (see Document 4: JP-A-2009-248224).

In the above machine tool, an air static pressure bearing connected to the spindle head is added to a tip of the spindle and supports the straight shank of the tool so that the tool is rotatable. A tapered end of the tool is brought into vacuum contact with the spindle, so that the tool is connected to the spindle.

In the above shrink fit as described in Document 3, the tool can be directly fixed to the spindle and a high axis accuracy can be secured. However, the shrink fit is required every time the tool is detached and attached, which requires heating and cooling time. For this reason, every time the tool is exchanged, the machining by the spindle is suspended for a long time to adversely lower an operation efficiency.

In the above arrangement as described in Document 4, the additional support structure is required and the support structure occupies a large space at the tip of the spindle. Accordingly, in addition to an increased restriction on machining, setting of the support structure is also restricted.

Further, a common problem of the arrangements to directly fix the tool to the spindle without using the holder is that a typical automatic tool exchanger configured to grip the standardized holder is unusable. Accordingly, for instance, it is necessary to move the spindle to a tool stocker and chuck the tool or to manually exchange the tool by an operator, so that an operation suspended time of the spindle is prolonged and unsuitable for increasing the operation efficiency.

In other words, without relying on the typical techniques described in Documents 3 and 4, a machine tool configured to directly fix the tool to the spindle and having a simple structure of the spindle has been desired.

Further, a machine tool configured to directly fix the tool to the spindle and capable of shortening the operation suspended time of the spindle at the exchange of the tool has been desired.

As a result of a dedicated study in response to such demands, the inventors developed a technique satisfying the above-described demands and filed a patent application as JP-A-2014-246055.

In the above patent application by the inventors, the following arrangement is employed in response to the demand for simplifying the structure.

A machine tool includes: a spindle rotatably supported on a spindle head; a chuck unit provided at a tip of the spindle; and a tool to be chucked to the chuck unit, in which the chuck unit includes: a cylindrical collet member into which the tool is insertible; a chuck hole that is open on an end surface of the spindle and in which the collet member is placeable; a squeezing mechanism that is formed between an outer circumference of the collet member and an inner circumference of the chuck hole and has a tapered surface extending from an opening of the chuck hole toward an innermost thereof and approaching a center axis of the spindle; and a pull-in mechanism configured to pull the collet member from the opening of the chuck hole toward the innermost thereof.

In the above machine tool, the tool can be clamped by being pulled in the axial direction of the spindle and squeezed over an entire circumference of the tool using the collet member, the chuck hole, the squeezing mechanism and the pull-in mechanism, so that the tool can be directly fixed to the spindle. Further, the structure of the spindle can be simplified without a mechanism projecting at the tip of the spindle.

In the above machine tool, the following arrangement is further employed in response to the demand for shortening the above suspended time.

The above machine tool further includes: a tool stocker that is provided out of a reach of the tip of the spindle and is capable of housing the tool; and a tool handler configured to attach the tool housed in the tool stocker to the spindle.

In such a machine tool, the tool handler can grip the tool housed in the tool stocker and attach the tool to the spindle. Accordingly, the operation of the spindle is not restrained except for time when the tool handler detaches and attaches the tool, so that duration when the operation of the spindle is suspended for tool exchange can be shortened.

Moreover, since the tool stocker can be disposed out of the reach of the tip of the spindle, the tool stocker neither interferes with the movement of the spindle nor narrows the movement range of the spindle.

Further, in the above machine tool, the tool handler includes: a tool holder configured to hold the tool; and a holder transfer mechanism configured to transfer the tool holder from the tool stocker to a reachable position of the spindle.

In the machine tool, the tool housed in the tool stocker can be held by the tool holder, the tool holder can be moved near the spindle by the holder transfer mechanism, and the tool can be attached to the spindle. On the other hand, the tool attached to the spindle can be collected by the tool holder and the tool holder can be transferred to the tool stocker by the holder transfer mechanism, whereby the tool can be returned to the tool stocker.

Accordingly, even when the tool stocker is disposed out of the reach of the tip of the spindle, detachment and attachment of the tool to the spindle can be reliably performed by the tool handler.

However, it is found that the use of the chuck unit, the tool handler and the tool stocker of the above machine tool by the inventors entails the following problems.

Specifically, in the tool handler, the tool is firmly held by the tool holder and the tool holder is transferred by the holder transfer mechanism to a tool exchange position (i.e., a reachable position of the spindle). For the tool exchange, the spindle is brought closer to the tool holder, the held tool is inserted into the collet member of the chuck unit, and the squeezing mechanism squeezes the tool to chuck.

At this time, even when the tool holder is placed in a predetermined tool exchange position, a slight axial misalignment is inevitable between a shaft center of the held tool and a shaft center of the chuck unit close to the tool.

Due to such axial misalignment, a deviated slide movement occurs between the tool and the collet member to decrease the holding accuracy of the tool by the chuck unit. Consequently, the tool chucked to the spindle is significantly vibrated in association with the rotation.

Moreover, at a large axial misalignment between the collet member and the tool, the tool cannot be smoothly inserted in the collet member, which may cause an operation failure at the tool exchange.

In addition to the above axial misalignment, from a viewpoint of the structure of the above chuck unit, when foreign substances (e.g., cut powders) enter the collet member, the chuck unit bites the foreign substances when clamping the tool, so that the holding accuracy of the tool cannot be secured and the vibration of the tool in association with the rotation occasionally becomes large.

The above problems of the chuck unit are common not only to the chuck unit including the collet member, the chuck hole, the squeezing mechanism and the pull-in mechanism as described in the above patent application by the inventor of the present application, but also to the chuck unit configured to attach the tool to the spindle in a manner to pull the tool therein in the axis direction of the spindle in order to directly fix the tool to the spindle.

SUMMARY OF THE INVENTION

An object of the invention is to provide a machine tool configured to attach a tool to a spindle by pulling the tool in an axis direction of the spindle and to reduce a deviated slide movement between the tool and a collet member.

According to an aspect of the invention, a machine tool includes: a spindle head; a spindle rotatably supported on the spindle head; a tool attachable to the spindle; a chuck unit provided to a tip of the spindle and configured to chuck the tool inserted in an axis direction of the spindle; a tool holder configured to hold the tool attached to the chuck unit; a holder transfer mechanism configured to move the tool holder to a reachable position of the spindle; and a support mechanism configured to support the tool holder on the holder transfer mechanism, in which the support mechanism includes a displacement following mechanism configured to support the tool holder on the holder transfer mechanism in a manner to be capable of displacing the tool holder in a direction intersecting an axis of the tool.

In the above aspect of the invention, while the tool is held by the tool holder in the axis direction of the spindle, the tool holder is transferred by the holder transfer mechanism and the tool is placed in a tool attachment position where the spindle can reach. Moreover, the spindle is transferred and the chuck unit is placed in the tool attachment position to face the tool. Subsequently, the chuck unit and the tool holder are relatively moved and the tool is inserted in the chuck unit to chuck the tool.

At this time, in the aspect of the invention, since the holder transfer mechanism includes the support mechanism for supporting tool holder and the displacement following mechanism provided to the support mechanism, the tool holder is displaceable on the holder transfer mechanism in the direction intersecting the axis direction of the tool. With this arrangement, even when the axial misalignment occurs between the shaft center of the tool held by the tool holder and the shaft center of the chuck unit at the insertion of the tool into the chuck unit, the tool holder can be displaced following the axial position of the chuck unit, so that the slide movement between the tool and the collet member can be reduced or dissolved.

On the other hand, when detaching the tool from the chuck unit, the chuck unit and the tool holder are placed at the tool attachment position in the same manner as when the tool is attached, and the tool chucked to the chuck unit is held by the tool holder. Subsequently, the chuck unit is separated from the tool holder, the tool is pulled out of the chuck unit in the axis direction and held only by the tool holder to be collected.

Also at this time, in other words, also when the tool is pulled out of the chuck unit, the slide movement possibly occurs due to the axial misalignment. However, in the same manner as when the tool is attached above, the support mechanism and the displacement following mechanism allow the follow-up movement for dissolving the axial misalignment, so that the slide movement between the tool and the collet member can be reduced or dissolved.

In the machine tool in the above arrangement, the displacement following mechanism preferably includes a portion elastically deformable in two directions that each intersect the axis of the tool and intersect each other.

As the elastically deformable portion, an arrangement in which a plate formed of an elastic member extends in two directions is applicable. For instance, a metal bracket bent in substantially L-shape in a plan view is usable.

With this arrangement, the displacement following mechanism can be in a simple structure and the displacement following mechanism can sufficiently function.

In the machine tool in the above arrangement, the support mechanism preferably includes a position adjusting mechanism configured to adjust a position of the tool holder relative to the holder transfer mechanism in the direction intersecting the axis of the tool.

With this arrangement, by adjusting the position of the tool holder in the holder transfer mechanism to the direction intersecting the axis of the tool, the axial misalignment constantly occurring between the shaft center of the tool held by the tool holder and the shaft center of the chuck unit can be reduced or dissolved.

With this adjustment, the follow-up movement for dissolving the axial misalignment by the displacement following mechanism is reduced, so that the slide movement between the tool and the collet member can be further reduced or dissolved.

The adjustment in the position adjusting mechanism can include an adjustment of the axial misalignment caused by parallel movement and an adjustment of the inclined shaft center of the tool caused by the rotation.

In the machine tool in the above arrangement, the position adjusting mechanism preferably includes portions positionally adjustable in two directions that each intersect the axis of the tool and intersect each other.

As the position-adjustable portions, screwable portions for respectively screwing two members are usable. For instance, the screwable portions for screwing the above bracket are usable. After the screwable portions are loosened and the respective positions are adjusted, the portions are again screwed to adjust the position.

With this arrangement, the position adjusting mechanism can be in a simple structure and the position adjusting mechanism can sufficiently function.

In the machine tool in the above arrangement, the chuck unit preferably includes: a cylindrical collet member into which the tool is insertible; a chuck hole that is open on an end surface of the spindle and in which the collet member is placeable; a squeezing mechanism that is formed between an outer circumference of the collet member and an inner circumference of the chuck hole and has a tapered surface extending from an opening of the chuck hole toward an innermost thereof and approaching a center axis of the spindle; and a pull-in mechanism configured to pull in the collet member from the opening of the chuck hole toward the innermost thereof.

With this arrangement, the tool is directly fixed to the spindle by the chuck unit provided at the tip of the spindle.

In the chuck unit, the collet member is pulled toward the innermost side of the chuck hole by the pull-in mechanism, whereby the collet member is squeezed by the squeezing mechanism, so that the tool inserted in the collet member is clamped.

Since the tool is thus clamped by the collet member, the tool can be firmly fixed even if the tool has a straight shank.

In the clamping by the collet member, the collet member is pulled in along the center axis of the spindle by the pull-in mechanism to be squeezed by the squeezing mechanism, so that the tool is squeezed. Accordingly, unlike a rotary outer cylinder configured to squeeze the collet member, deformation in a rotation direction and deviation in an axial direction are not caused on the collet member, so that the tool can be fixed with a high accuracy.

On the other hand, the clamping of the tool by the collet member can be released by pulling the collet member toward the tip of the spindle against the pull-in force of the pull-in mechanism to release the collet member from the squeezed state by the squeezing mechanism, so that the tool can be removed from the spindle.

When the clamped tool is released, another mechanism for releasing the pull-in force caused by the pull-in mechanism may be used, or alternatively, another driving mechanism for moving the collet member against the pull-in force caused by the pull-in mechanism may be used. For instance, the collet member can be driven by feeding a pressurized air through a coolant hole defined at the center of the spindle.

Accordingly, in the above aspect of the invention, the tool can be clamped by being pulled in the axial direction of the spindle and squeezed over an entire circumference of the tool using the collet member, the chuck hole, the squeezing mechanism and the pull-in mechanism, so that the tool can be directly fixed to the spindle. Further, the structure of the spindle can be simplified without a mechanism projecting at the tip of the spindle.

The chuck unit may be directly formed at the tip of the spindle. Specifically, the chuck unit may be provided by a chuck hole directly formed on the spindle per se to house the collet member therein. Alternatively, a sleeve member having the chuck hole may be used. The collet member is housed in the sleeve member, thereby providing a packaged chuck unit. The packaged chuck unit may be fixed to the spindle. The packaged chuck unit may collectively further include the squeezing mechanism and the pull-in mechanism.

In the machine tool in the above arrangement, the squeezing mechanism preferably has an outer conical surface formed on an outer circumference of the collet member and enlarging toward a tip of the spindle and an inner conical surface formed on an inner circumference of the chuck hole and capable of closely contacting with the outer conical surface.

With this arrangement, the outer conical surface of the collet member and the inner conical surface of the chuck hole define a suitable structure of the squeezing mechanism in which the collet member is squeezable when pulled toward the innermost side of the chuck hole.

The squeezing mechanism is defined not only by the conical surface but also by an inclined surface, the inclined surface being defined by surfaces of a plurality of equidistant projections circumferentially disposed on an outer circumferential surface of the collet member or an inner surface of the chuck hole, the plurality of projections extending in the axis direction of the spindle, the surfaces being closer to the center axis toward the innermost of the chuck hole.

In the machine tool in the above arrangement, the pull-in mechanism preferably has an elastic pull-in member configured to bias the collet member with respect to the spindle to an opposite side from the tip of the spindle.

With this arrangement, a pull-in force can be obtained using the elasticity of the elastic pull-in member and a separate power source is not required, so that a structure of the pull-in mechanism can be effectively simplified.

In the machine tool in the above arrangement, the elastic pull-in member is preferably provided by a plurality of disc springs layered in the axial direction of the spindle.

With this arrangement, the elastic pull-in force can be obtained by the plurality of disc springs and it is easy to determine the pull-in force by selecting the number and/or a type of the disc springs. Moreover, the plurality of disc springs can be aligned by being inserted around a center shaft and can be prevented from vibrating even during a high-speed rotation. Accordingly, no disadvantage is caused even when the plurality of disc springs are provided to the spindle to be subjected to a high-speed rotation.

The elastic pull-in member is provided not only by the plurality of disc springs but also by other elastic members such as a coil spring and a material for compressing a volume.

In the machine tool in the above arrangement, the spindle is preferably supported by the spindle head by an air bearing.

With this arrangement, since the spindle is supported on the spindle head by the air bearing, the machine tool can be rotated at a high speed with a high accuracy and the effectiveness of the chuck unit with the above arrangement can be obtained at the maximum level.

A component of rotatably supporting the spindle on the spindle head may be not only the air bearing but also other bearings as long as a predetermined accuracy and rotation speed are obtainable.

The machine tool in the above arrangement preferably further includes: a tool stocker that is provided out of a reach of the tip of the spindle and is capable of housing the tool; and a tool handler including the tool holder and the holder transfer mechanism and configured to attach the tool housed in the tool stocker to the spindle.

With this arrangement, the tool handler holds the tool housed in the tool stocker and attaches the tool to the spindle. Accordingly, the operation of the spindle is not restrained except for time when the tool handler detaches and attaches the tool, so that duration when the operation of the spindle is suspended for tool exchange can be shortened.

Moreover, since the tool stocker can be disposed out of the reach of the tip of the spindle, the tool stocker neither interferes with the movement of the spindle nor narrows the movement range of the spindle.

In the machine tool in the above arrangement, the tool holder preferably includes a pair of tool holding members configured to hold the tool.

With this arrangement, since the tool is held by the pair of tool holding members, the tool can be firmly held even if the tool has a straight shank and/or the shank has a variety of diameters.

In the machine tool in the above arrangement, the tool holder preferably includes: a supplying tool holder configured to hold the tool to be attached to the spindle; and a receiving tool holder configured to hold the tool collected from the spindle.

With this arrangement, the holder transfer mechanism of the tool handler brings the supplying tool holder closer to the tool stocker, and makes the supplying tool holder hold a next tool to be attached to the spindle. In this state, the holder transfer mechanism brings the receiving tool holder closer to the spindle and makes the receiving tool holder hold the current tool attached to the spindle.

Subsequently, by the movement of the spindle or the movement of the holder transfer mechanism, the spindle is brought closer to the supplying tool holder and the next tool is attached to the spindle. Subsequently, the holder transfer mechanism is separated from the spindle and the operation of the spindle is re-started. Simultaneously with the re-start of the operation of the spindle, by the movement of the holder transfer mechanism, the receiving tool holder is brought closer to the tool stocker and the tool removed from the spindle is returned to the tool stocker.

By thus using the supplying tool holder and the receiving tool holder as the tool holder of the tool handler, an exchange of the current tool and the next tool between the tool stocker and the spindle can be conducted in a single movement of the holder transfer mechanism.

The supplying tool holder and the receiving tool holder may be movably provided to the holder transfer mechanism. The receiving tool holder faces the spindle and collects the current tool. Subsequently, the supplying tool holder moves to a position facing the spindle and attaches the next tool to the spindle. Accordingly, detachment and attachment of the tool to the spindle can be continuously conducted without moving the spindle.

Alternatively, the supplying tool holder and the receiving tool holder may be aligned in the moving direction of the holder transfer mechanism, whereby the supplying tool holder and the receiving tool holder alternately face the spindle by slightly moving the holder transfer mechanism. Also with this arrangement, detachment and attachment of the tool to the spindle can be continuously conducted without moving the spindle.

In the machine tool in the above arrangement, the holder transfer mechanism is preferably provided by a rotary arm having a rotation center out of the reach of the tip of the spindle and having a tip rotatable from the position of the tool stocker to the reachable position of the spindle.

With this arrangement, since the holder transfer mechanism is rotatable, a slide part can be decreased as compared with an instance where the holder transfer mechanism is linearly moved, thereby preventing occurrence of failure and the like caused by cut pieces in the slide part.

The holder transfer mechanism may be linearly moved. For instance, when a primary part of the machine tool including the spindle is covered with a dustproof cover and a primary part of each of the tool stocker and the tool handler is provided to an exterior of the dustproof cover, the dustproof cover requires a door or the like through which a tool holder side of the holder transfer mechanism moves in and out of the dustproof cover. However, a size of the door or the like can be minimized with the linear movement of the holder transfer mechanism.

The machine tool in the above arrangement preferably further includes a tool transfer mechanism configured to transfer the tool between the tool stocker and the tool holder.

With this arrangement, even when the tool holder of the tool handler cannot exchange the tool with the tool stocker only by its own force, or when the holder transfer mechanism of the tool handler cannot bring the tool holder sufficiently close to the tool stocker, the tool can be reliably exchanged by the tool transfer mechanism.

As such a tool transfer mechanism, an existing SCARA robot, other robot arms and the like are usable as needed.

According to the machine tool in the above aspect of the invention, the tool is directly fixed to the spindle by the chuck unit provided at the tip of the spindle. Since the tool holder is supported on the holder transfer mechanism by the support mechanism including the displacement following mechanism, even when the axial misalignment occurs between the shaft center of the tool held by the tool holder and the shaft center of the chuck unit at the tool exchange, the tool holder can be displaced following the axial position of the chuck unit, so that the slide movement between the tool and the collet member can be reduced or dissolved.

BRIEF DESCRIPTION OF DRAWING(S)

DESCRIPTION OF EMBODIMENT(S)

Structure of Machine Tool 10

FIGS. 1 to 10 show an exemplary embodiment of the invention.

Figure 1:
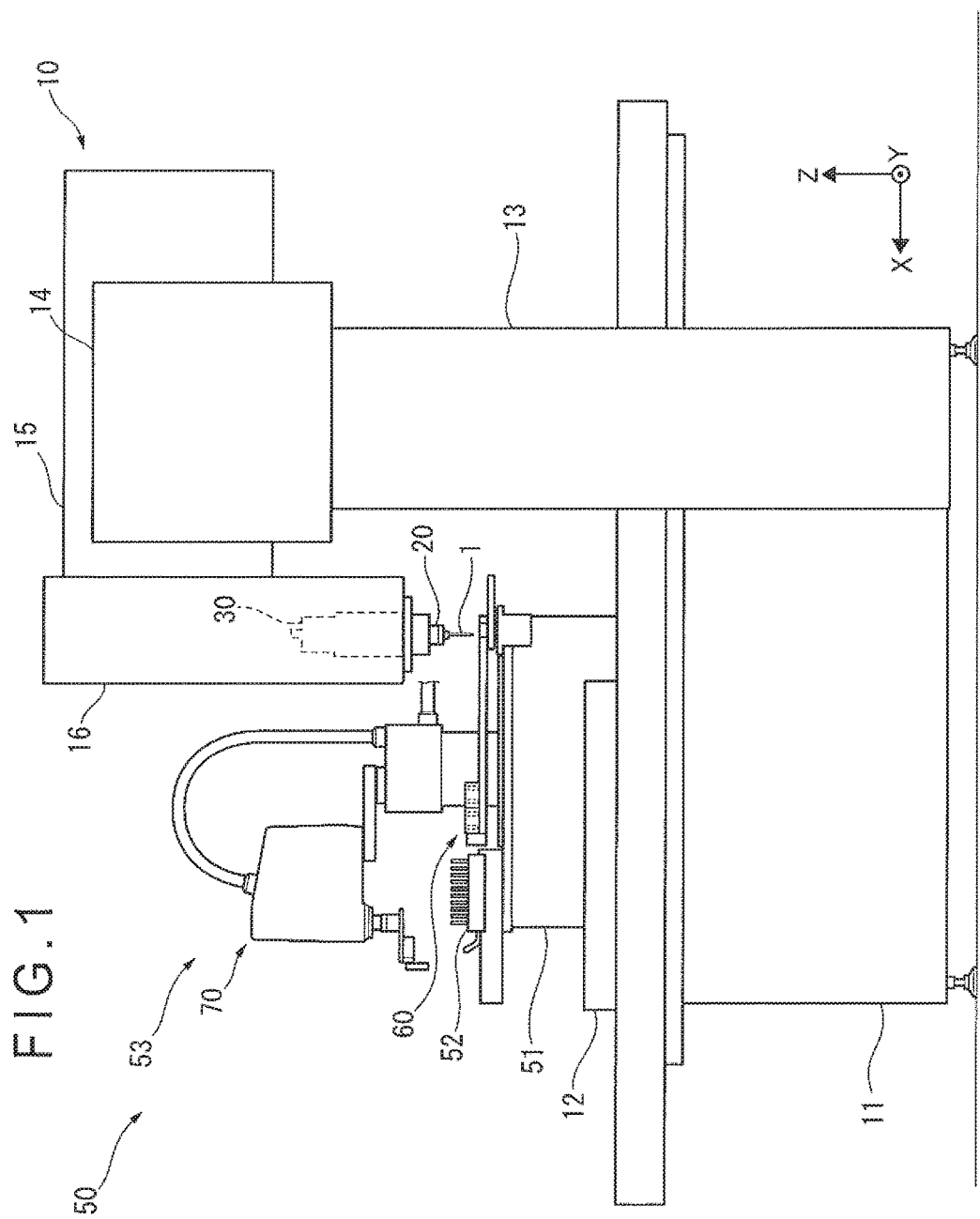
FIG. 1 is a front view showing a machine tool according to an exemplary embodiment of the invention.
Figure 2:
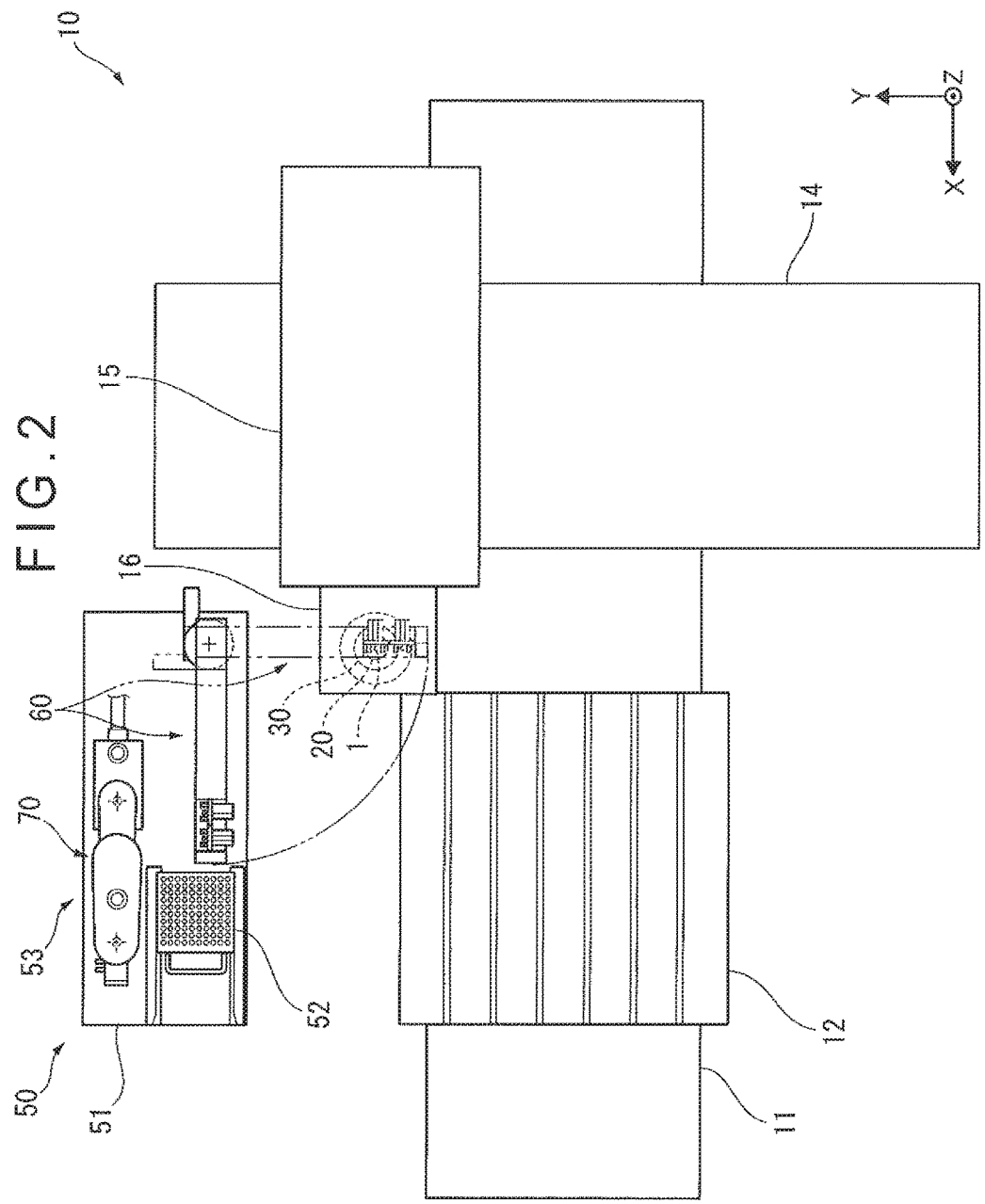
FIG. 2 is a plan view showing the machine tool according to the exemplary embodiment.
Figure 3:
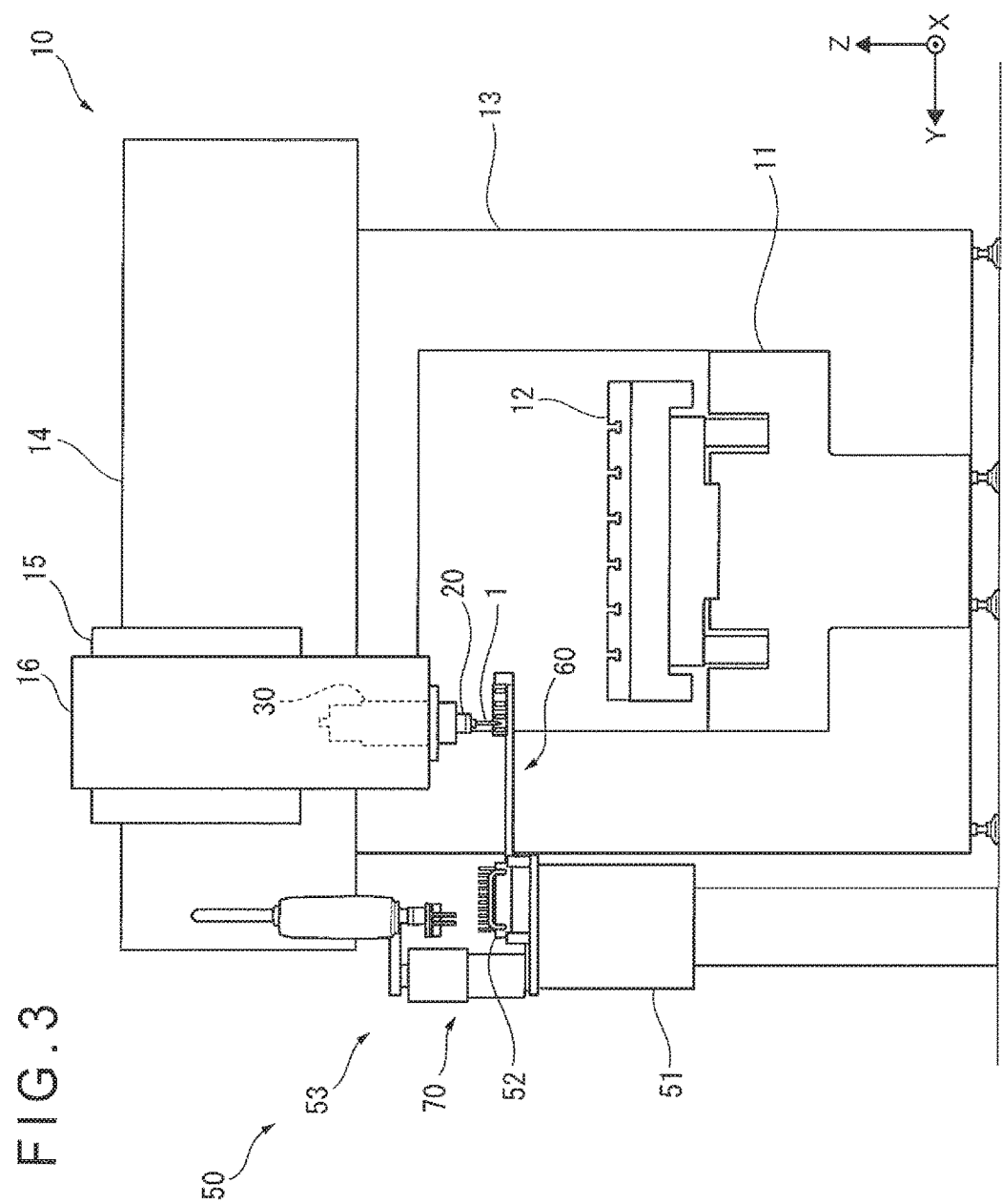
FIG. 3 is a side view showing the machine tool according to the exemplary embodiment.

In FIGS. 1, 2 and 3, a machine tool 10 according to exemplary embodiment is configured to cut a workpiece at a high speed and with a high accuracy using a tool 1 having a straight shank and attached to a spindle 20.

The machine tool 10 includes a bed 11 provided on a base floor and a table 12 provided on a top surface of the bed 11. The workpiece, which is an object to be machined, is fixed on the top surface of the table 12.

A portal column 13 is provided across the bed 11. A cross bar 14 is provided on the column 13. A saddle 15 is provided to the cross bar 14.

A spindle head 16 is provided to the saddle 15. The spindle 20 is provided to the spindle head 16 in a suspended manner and is configured to cut the workpiece fixed on the table 12.

The table 12 is movable on the bed 11 in an X-axis direction (a right-left direction in FIGS. 1 and 2). The saddle 15 is movable along the cross bar 14 in a Y axis direction (in a top-bottom direction in FIG. 2 and in a right-left direction in FIG. 3). The spindle head 16 is movable along the saddle 15 in a Z axis direction (in a top-bottom direction in FIGS. 1 and 3).

By such axial movement, the spindle 20 and the tool 1 are movable in three dimensions relative to the workpiece, thereby cutting the workpiece into any three-dimensional shape.

The spindle 20 provided to the spindle head 16 is included in a package in a form of a spindle assembly 30.

Figure 4:
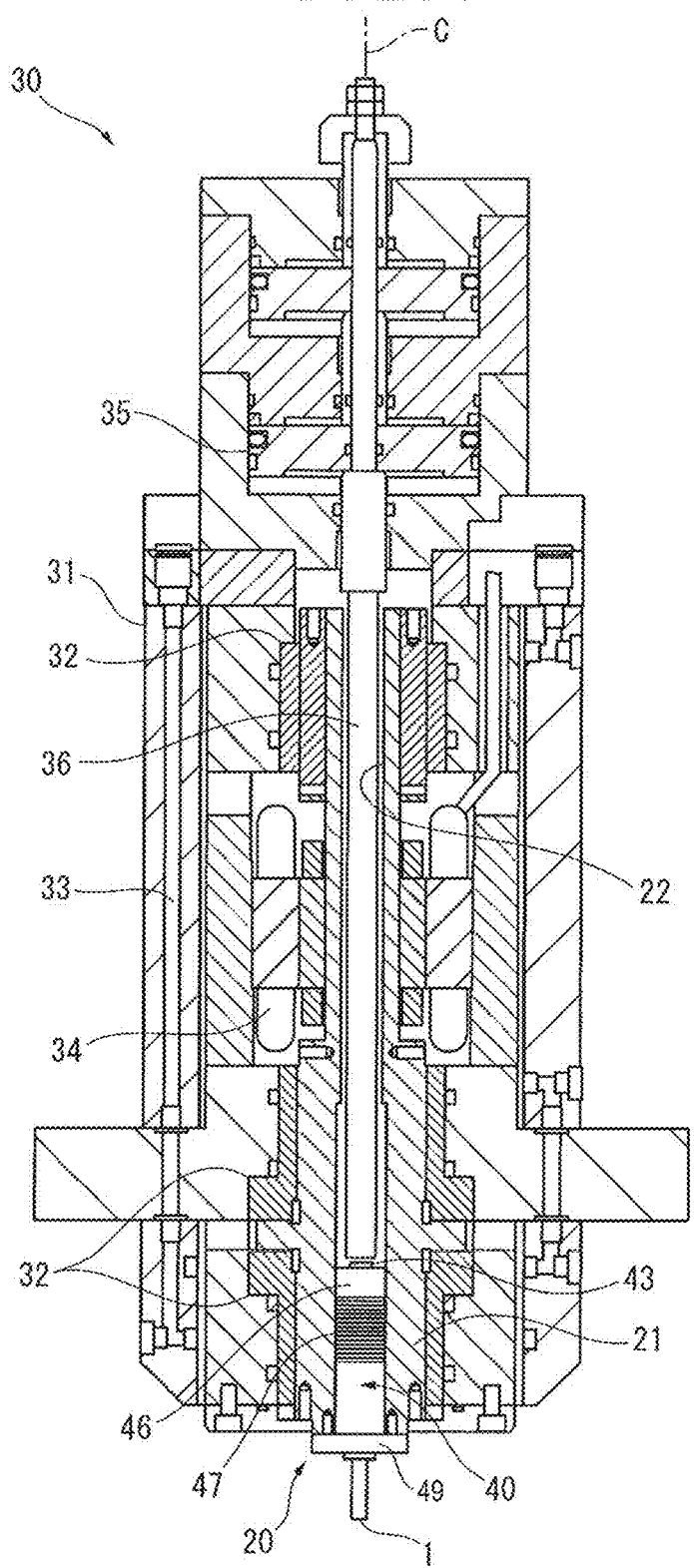
FIG. 4 is a cross-sectional view showing a spindle according to the exemplary embodiment.

As shown in FIG. 4, the spindle assembly 30 includes: a substantially cylindrical assembly case 31; the spindle 20 provided inside the assembly case 31; an air bearing 32 supporting the spindle 20 in a manner to be rotatable around a center axis C; an air supply passage 33 supplying pressurized air to the air bearing 32; and a driving motor 34 configured to rotate the spindle 20 around the center axis C.

The spindle 20 includes a spindle body 21 having a center hole 22 at the center, the center hole 22 penetrating the spindle body 21 along the center axis C of the spindle 20.

A chuck unit 40 configured to attach the tool 1 to the spindle 20 is provided at a tip of the spindle 20.

The spindle assembly 30 further includes a push cylinder 35 on an opposite side (hereinafter, referred to as a "base (side)") from the tip of the spindle 20. The push cylinder 35 is connected to a push rod 36. The push rod 36 is inserted into the center hole 22 of the spindle 20, in which a tip of the push rod 36 reaches the chuck unit 40.

Figure 5:
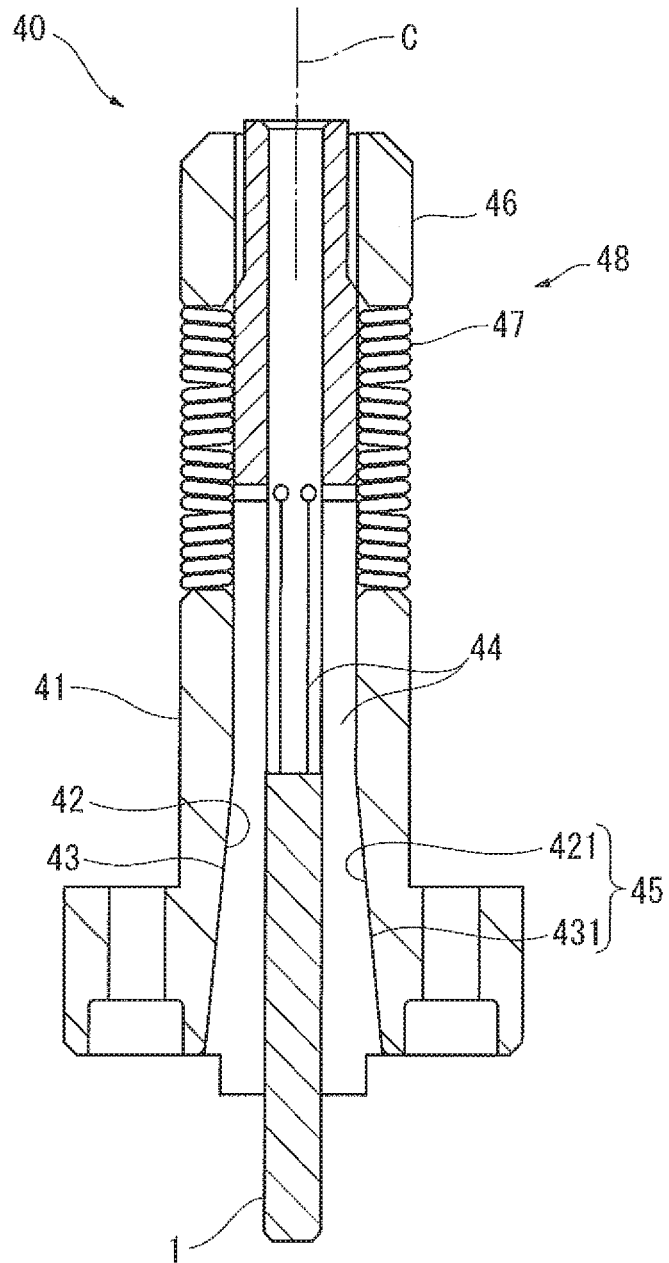
FIG. 5 is a cross-sectional view showing a chuck unit according to the exemplary embodiment.

As shown in FIG. 5, the chuck unit 40 includes: a sleeve member 41 fixed to the tip of the top spindle 20; and a chuck hole 42 formed from a tip side toward a base side of the sleeve member 41. The collet member 43 is housed in the chuck hole 42.

The collet member 43 is formed cylindrical. The tool 1 is insertible into the collet member 43 from a tip side of the collet member 43. The collet member 43 is formed with a plurality of slots 44 from the tip side to a middle of the collet member 43. With the slots 44, the tip side of the collet member 43 (where the tool 1 is inserted) is elastically deformable to increase or decrease a diameter of the collet member 43.

An outer circumferential surface of the tip side of the collet member 43 is formed so that an outer diameter of the collet member 43 is gradually increased toward the tip to define an outer conical surface 431.

At the tip side of the sleeve member 41, an inner circumferential surface of the chuck hole 42 is formed so that an inner diameter of the chuck hole 42 is gradually increased toward the tip of the sleeve member 41 to define an inner conical surface 421.

The outer conical surface 431 and the inner conical surface 421 are tightly contactable to each other by inserting the collet member 43 into the chuck hole 42. By further pushing the collet member 43, which is in a tight contact with the chuck hole 42, into an innermost side of the chuck hole 42, the outer conical surface 431 is squeezed by the inner conical surface 421, so that the tip side of the collet member 43 is deformed to decrease the diameter thereof.

The outer conical surface 431 and the inner conical surface 421 define a squeezing mechanism 45. By decreasing the diameter of the tip side of the collet member 43 using the squeezing mechanism 45, a straight shank of the tool 1 inserted from the tip of the collet member 43 can be clamped.

The base side of the collet member 43 is exposed from the sleeve member 41. A collet nut 46 is screwed on an end of the base side of the collet member 43. A number of disc springs 47 are put in a layered state around a portion of the collet member 43 exposed from the sleeve member 41.

The disc springs 47 are held between the sleeve member 41 and the collet nut 46. By the elastic repulsion force of the disc springs 47, the collet nut 46 and the collet member 43 are biased with respect to the sleeve member 41 toward the base side.

The disc springs 47 and the collet nut 46 define a pull-in mechanism 48. With this pull-in mechanism 48, the collet member 43 is constantly pulled toward the innermost side of the chuck hole 42, so that the diameter of the tip side of the collet member 43 is constantly kept reduced.

Accordingly, while the straight shank of the tool 1 is kept inserted from the tip of the collet member 43, the tool 1 is kept in a clamped state by the pull-in mechanism 48.

Referring back to FIG. 4, the chuck unit 40 is inserted into the center hole 22 from the tip side of the spindle body 21.

A flange 49 of the sleeve member 41 is fixed to an end surface of the spindle body 21. The base side of the chuck unit 40 is positioned so that the end of the collet member 43 faces the tip of the push rod 36 with a slight clearance therebetween.

When the push cylinder 35 advances the push rod 36 toward the tip side, the push rod 36 pushes the collet member 43, so that the collet member 43 moves toward the tip side against a pull-in force of the pull-in mechanism 48. With this movement, the outer conical surface 431 of the collet member 43 is separated from the inner conical surface 421 of the chuck hole 42, so that a squeezed state of the tip of the collet member 43 caused by the squeezing mechanism 45 is released. Consequently, the clamped state of the tool 1 by the tip of the collet member 43 is released, so that the tool 1 is removable from the chuck unit 40.

Thus, the chuck unit 40 is configured to release the clamped state of the tool 1 by advancing the push rod 36 toward the tip side using the push cylinder 35 and to again clamp the tool 1 by returning the push rod 36 to again enable the pull-in mechanism 48 and the squeezing mechanism 45.

The machine tool 10 includes an automatic tool changer 50 configured to detach and attach the tool 1 when the chuck unit 40 is in a state released from the clamping state.

As shown in FIGS. 1, 2 and 3, the automatic tool changer 50 includes a support base 51 provided adjacent to the bed 11 on the base floor. A tool stocker 52 and a tool handler 53 are provided on a top surface of the support base 51.

Figure 6:
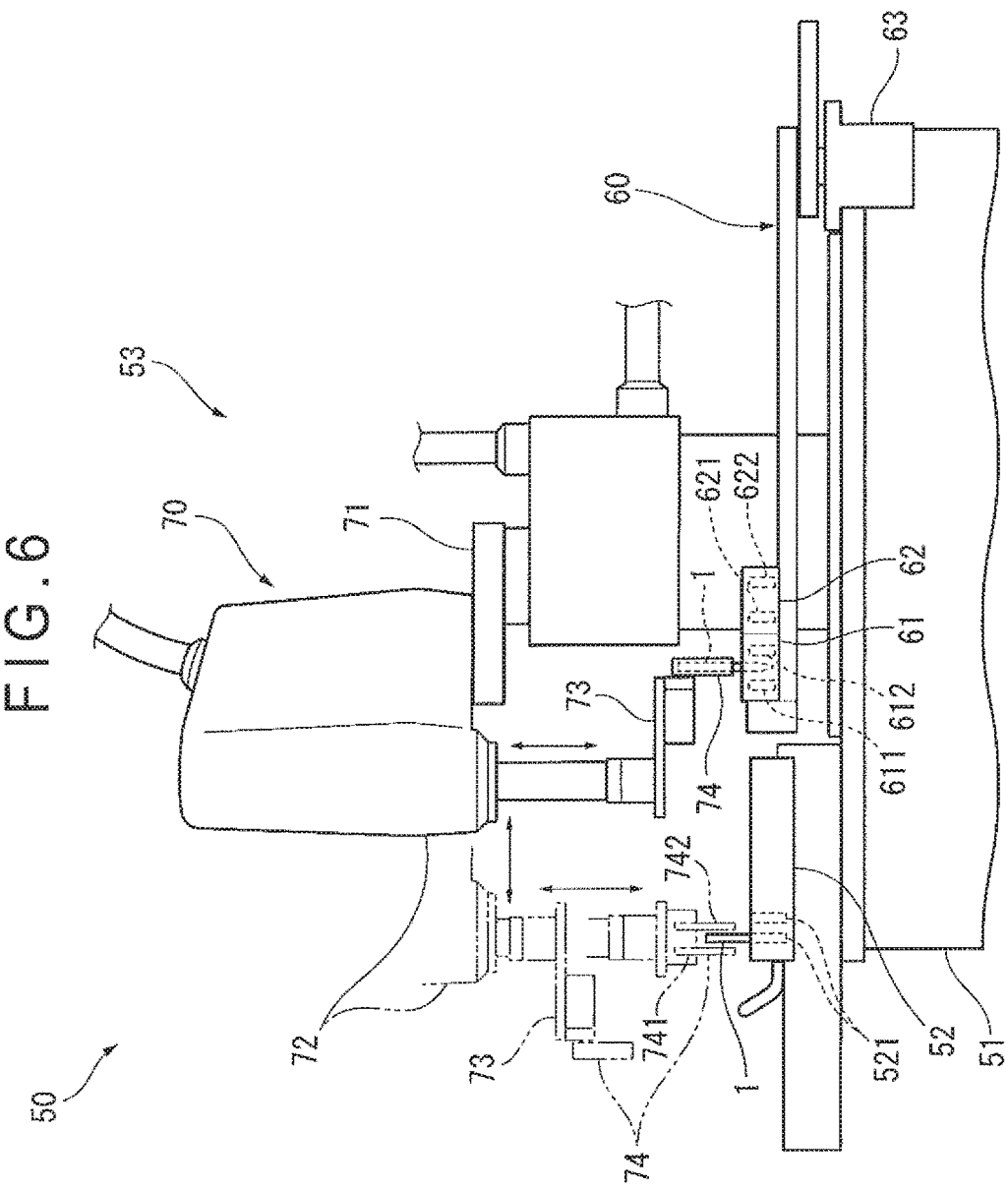
FIG. 6 is a front view showing a tool stocker and a tool handler according to the exemplary embodiment.
Figure 7:
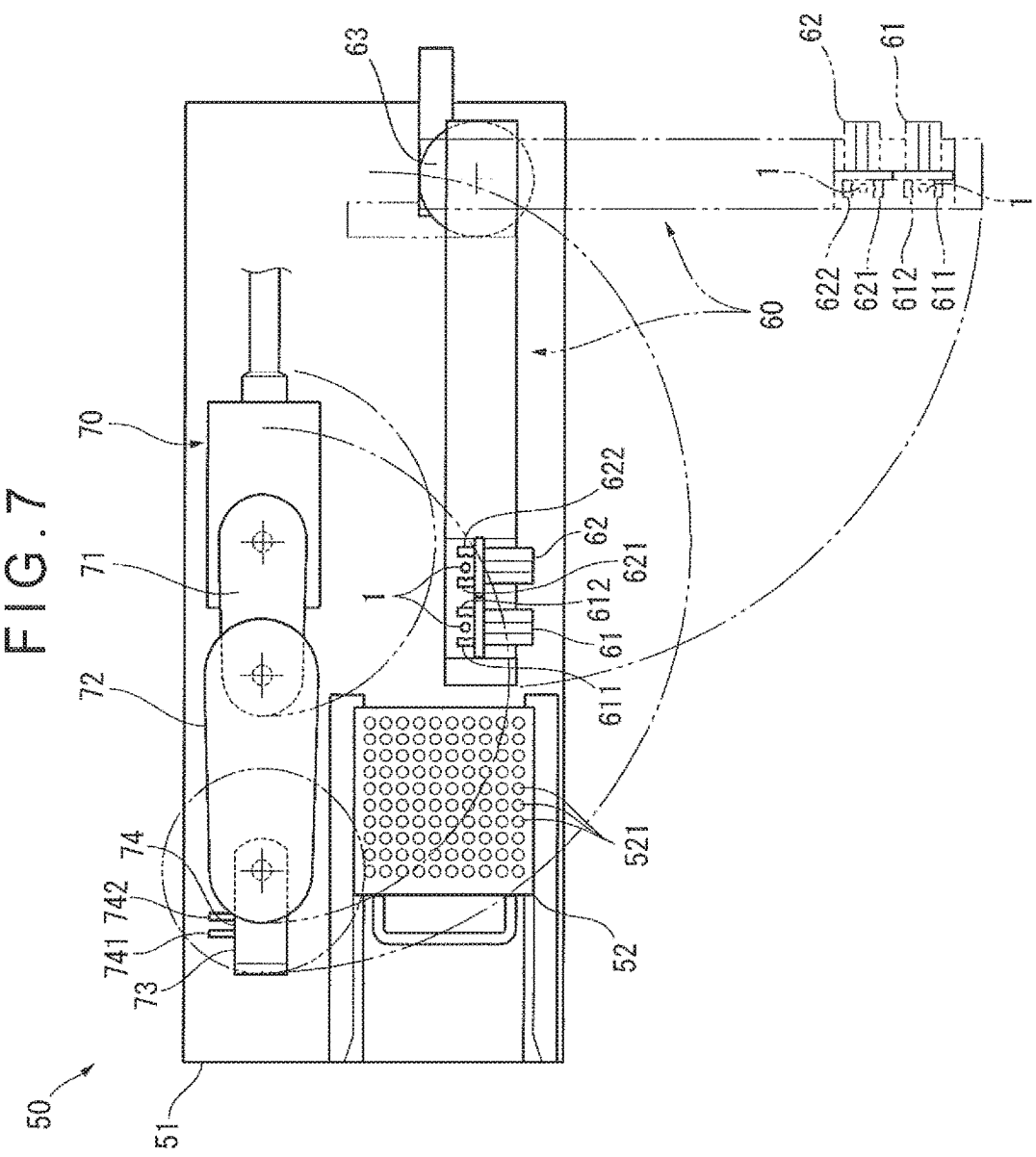
FIG. 7 is a plan view showing the tool stocker and the tool handler according to the exemplary embodiment.
Figure 8:
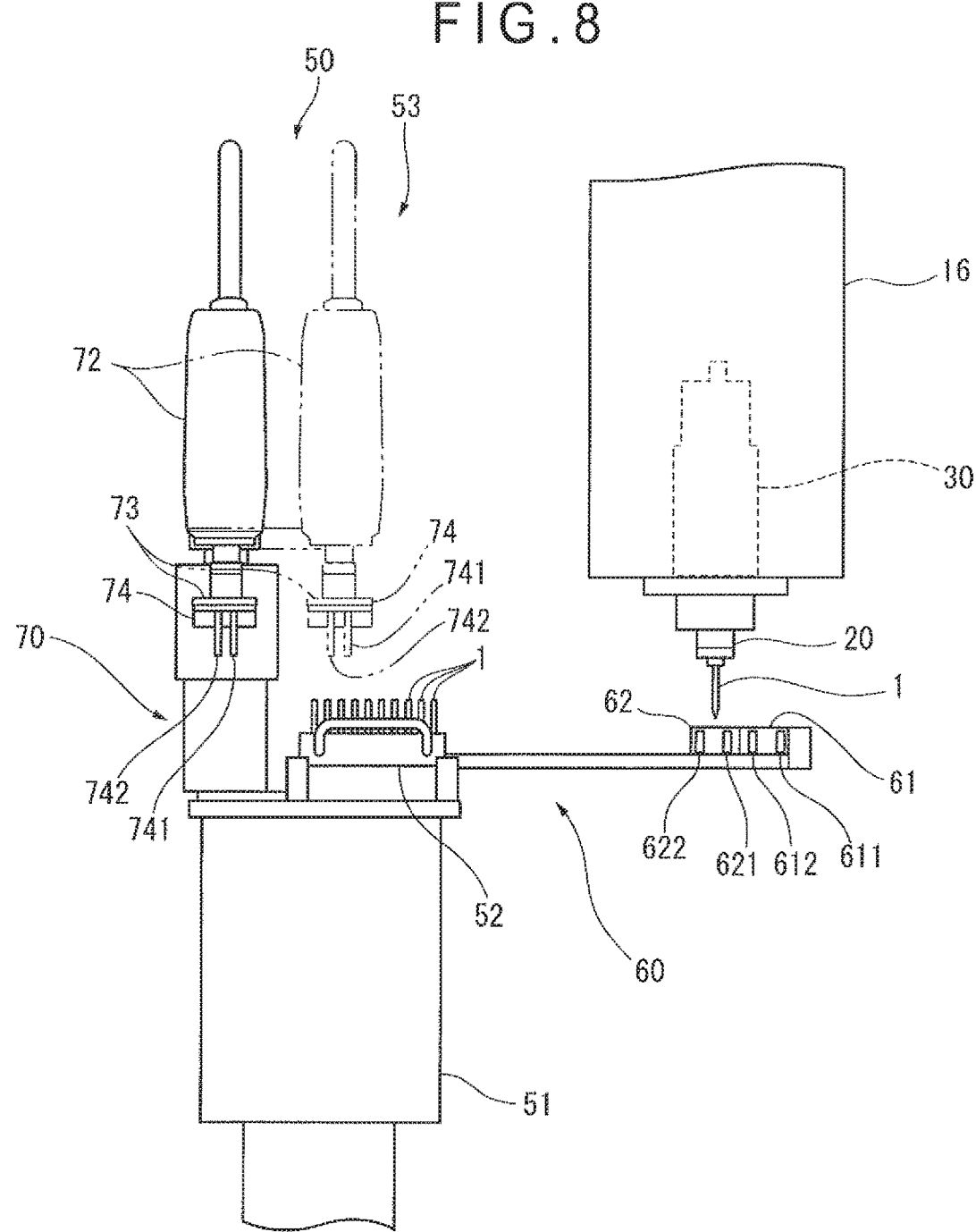
FIG. 8 is a side view showing the tool stocker and the tool handler according to the exemplary embodiment.

As shown in FIGS. 6, 7 and 8 in an enlarged manner, the tool stocker 52 includes: a main body in a rectangular plate; and a number of tool housing holes 521 on a top surface of the main body. For instance, the tool housing holes 521 may include 100 holes in total (lengthwise and crosswise by 10×10).

The tool handler 53 includes a holder transfer mechanism in a form of a rotary arm 60.

A base of the rotary arm 60 is rotatably supported by the rotary motor 63. A tip of the rotary arm 60 is movable along an arc locus (see FIG. 7).

The rotation center of the rotary arm 60 (i.e., the rotation axis of the rotary motor 63) is positioned out of a reach of the tip of the spindle 20 of the machine tool 10.

The tip of the rotary arm 60 is positionable near the tool stocker 52 (shown in a solid line in FIG. 7) and also positionable at a position where the spindle 20 of the machine tool 10 can reach when rotated (shown in a chain line in FIG. 7, also see FIG. 2).

A tool holder in forms of a receiving tool holder 61 and a supplying tool holder 62 is provided to the tip of the rotary arm 60.

Figure 9:
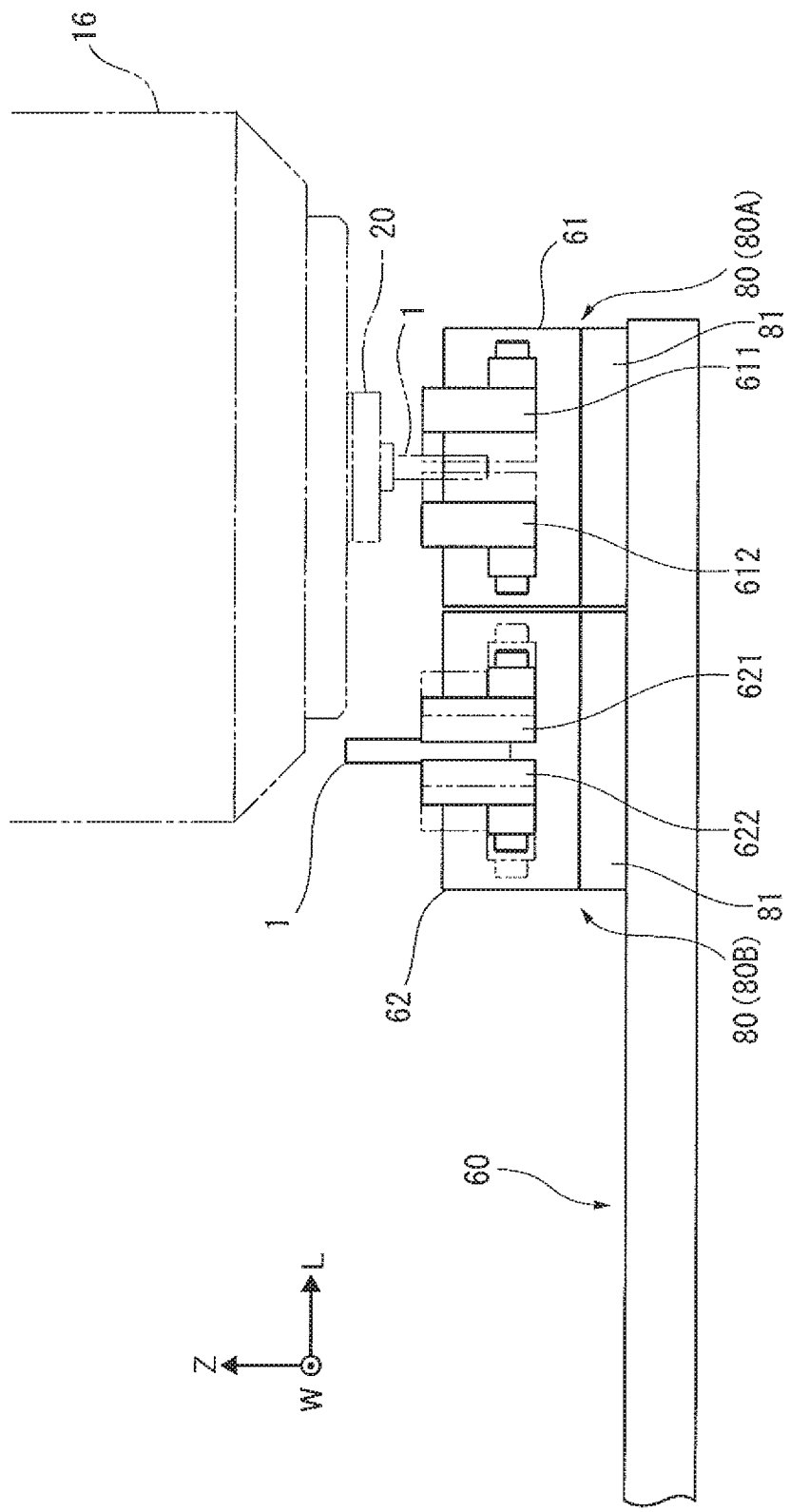
FIG. 9 is a front view showing a tool holder according to the exemplary embodiment.
Figure 10:
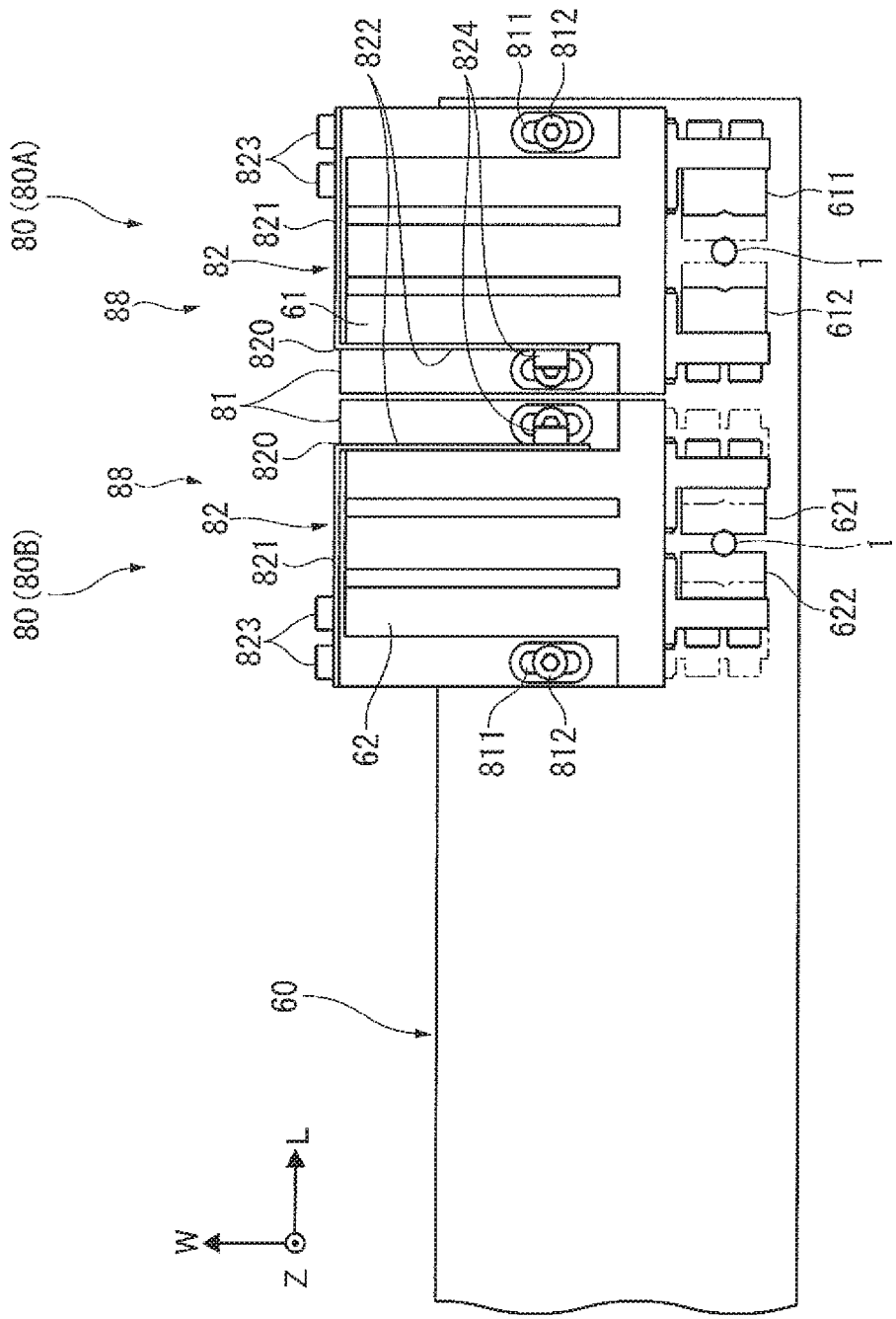
FIG. 10 is a plan view showing the tool holder according to the embodiment.

As shown in FIGS. 9 and 10, the receiving tool holder 61 and the supplying tool holder 62 respectively include a pair of levers 611, 612 and a pair of levers 621, 622 and are configured to hold the straight shank of the tool 1 with the levers.

The receiving tool holder 61 is configured to hold the tool 1 when the spindle 20 is brought closer to the receiving tool holder 61 and the tool 1 is placed between the levers 611, 612.

In this state, when the clamping state of the chuck unit 40 is released and the spindle 20 is raised, the tool 1 is removed from the chuck unit 40 to be held by the receiving tool holder 61.

By this operation, the tool 1 having attached to the spindle 20 is collected by the receiving tool holder 61.

The supplying tool holder 62 in a state of holding the tool 1 is positioned under the spindle 20. In a state where the clamped chuck unit 40 is released, the spindle 20 is lowered and the tool 1 held by the supplying tool holder 62 is inserted into the chuck unit 40.

In this state, when the clamping of the chuck unit 40 is enabled and the spindle 20 is raised, the tool 1 is removed from the supplying tool holder 62.

By this operation, a substitution tool 1 from the supplying tool holder 62 is attachable to the spindle 20.

Referring back to FIGS. 6, 7 and 8, the rotary arm 60 is configured to rotate to position the receiving tool holder 61 and the supplying tool holder 62 adjacent to the tool stocker 52.

A tool transfer mechanism in a form of a SCARA robot 70 is provided in order to return the tool 1 from the adjacent receiving tool holder 61 to the tool stocker 52 and mount the substitution tool 1 from the tool stocker 52 to the supplying tool holder 62.

The SCARA robot 70 includes a first arm 71, a second arm 72, and a third arm 73 which are horizontally rotatable and sequentially connected. The second arm 72 and the third arm 73 are also movable in a vertical direction along the rotation axis.

A transfer holder 74 for holding the tool 1 is provided at a tip of the third arm 73.

The transfer holder 74 includes a pair of levers 741, 742 and is configured to hold the straight shank of the tool 1 with the levers.

As shown in FIG. 6, the SCARA robot 70 operates the first arm 71, the second arm 72, and the third arm 73 to position the transfer holder 74 immediately above the receiving tool holder 61 and lower the transfer holder 74, so that the tool 1 held by the receiving tool holder 61 can be held by the transfer holder 74. When the SCARA robot 70 moves the transfer holder 74 to the tool stocker 52, the held tool 1 can be returned to the tool stocker 52.

On the other hand, the SCARA robot 70 operates the transfer holder 74 to hold any one of the tools 1 housed in the tool stocker 52 and operates the arms to move the transfer holder 74 to the supplying tool holder 62, so that the tool 1 can be held by the supplying tool holder 62.

By this operation, the SCARA robot 70 can exchange the tool 1 between the tool stocker 52 and the receiving tool holder 61/supplying tool holder 62.

Operation of Machine Tool 10

The machine tool 10 in the exemplary embodiment operates as follows.

In the normal operation, the machine tool 10 cuts the workpiece fixed on the table 12 using the tool 1 attached to the spindle 20.

For the exchange of the tool 1, any one of the tools 1 housed in the tool stocker 52 is selected by the SCARA robot 70 and held by the supplying tool holder 62 of the rotary arm 60. In this state, the spindle 20 may continue machining the workpiece.

Next, the rotary arm 60 is rotated so that the tip thereof is positioned above the table 12. In this state, machining by the spindle 20 is suspended and the spindle 20 is positioned above the tip of the rotary arm 60. Next, the chuck unit 40 is released, so that the currently attached tool 1 is collected by the receiving tool holder 61.

Subsequently, the spindle 20 is moved above the supplying tool holder 62 and receives the substitution tool 1 from the supplying tool holder 62. The clamping of the substitution tool 1 by the chuck unit 40 is then enabled.

By this operation, the substitution tool 1 is attached to the spindle 20. The machining of the workpiece is restarted immediately after the rotary arm 60 is moved away from the table 12.

After the tip of the rotary arm 60 is moved back near the tool stocker 52, the SCARA robot 70 collects the tool 1 held by the receiving tool holder 61 and returns the collected tool 1 to the tool stocker 52.

Advantages of Machine Tool 10

According to the machine tool 10 in the exemplary embodiment, the following advantages are obtained.

In the exemplary embodiment, the tool 1 is directly fixed to the spindle 20 by the chuck unit 40 provided at the tip of the spindle 20.

In the chuck unit 40, the collet member 43 is pulled toward the innermost side of the chuck hole 42 by the pull-in mechanism 48, whereby the collet member 43 is squeezed by the squeezing mechanism 45, so that the tool 1 inserted in the collet member 43 is clamped.

Since the tool 1 is thus clamped by the collet member 43, the tool 1 can be firmly fixed even if the tool 1 has a straight shank.

In order to clamp the tool 1 by the collet member 43, the collet member 43 is pulled along the center axis C of the spindle 20 by the pull-in mechanism 48 and squeezed by the squeezing mechanism 45, so that the tool 1 is clamped. Accordingly, unlike a rotary outer cylinder configured to squeeze the collet member 43, deformation in a rotation direction and deviation in an axial direction are not caused on the collet member 43, so that the tool 1 can be fixed with a high accuracy.

On the other hand, the tool 1 clamped by the collet member 43 can be released by pulling the collet member 43 toward the tip of the spindle 20 against the pull-in force of the pull-in mechanism 48 to release the collet member 43 from the squeezed state by the squeezing mechanism 45, so that the tool can be removed from the spindle 20.

Thus, in the exemplary embodiment, the tool 1 can be clamped by being pulled in the axial direction of the spindle 20 and squeezed over an entire circumference of the tool 1 using the collet member 43, the chuck hole 42, the squeezing mechanism 45 and the pull-in mechanism 48, so that the tool 1 can be directly fixed to the spindle 20. Further, a structure of the spindle 20 can be simplified without a mechanism projecting at the tip of the spindle 20.

In the exemplary embodiment, the outer conical surface 431 of the collet member 43 and the inner conical surface 421 of the chuck hole 42 define a suitable structure of the squeezing mechanism 45 in which the collet member 43 is squeezable when pulled toward the innermost side of the chuck hole 42.

In the exemplary embodiment, the pull-in mechanism 48 is provided by an elastic pull-in member in a form of a plurality of disc springs 47. Since a pull-in force can be obtained using the elasticity of the pull-in mechanism 48 and a separate power source is not required, the structure of the pull-in mechanism 48 can be effectively simplified.

Moreover, it is easy to determine the pull-in force by selecting the number and/or a type of the disc springs 47. Further, the plurality of disc springs 47 can be aligned by being put around a center shaft and can be prevented from vibrating even during a high-speed rotation. Accordingly, no disadvantage is caused even when the plurality of disc springs 47 are provided to the spindle to be subjected to a high-speed rotation.

In the exemplary embodiment, since the spindle 20 is supported on the spindle head 16 by the air bearing 32, the machine tool 10 can be rotated at a high speed with a high accuracy and the effectiveness of the chuck unit 40 can be obtained at the maximum level.

In the exemplary embodiment, the automatic tool changer 50 is provided, whereby the tool handler 53 holds the tool 1 housed in the tool stocker 52 and attaches the tool 1 to the spindle 20. Accordingly, the operation of the spindle 20 is not restrained except for time when the tool handler 53 detaches and attaches the tool 1, so that duration when the operation of the spindle 20 is suspended for tool exchange can be shortened.

Moreover, since the tool stocker 52 can be disposed out of the range where the tip of the spindle 20 reaches (e.g., a side of the table 12), the tool stocker 52 neither interferes with the movement of the spindle 20 nor narrows the movement range of the spindle 20.

In the exemplary embodiment, the tool 1 housed in the tool stocker 52 can be held by the supplying tool holder 62, moved near the spindle 20 on the table 12 by the rotary arm 60, and attached to the spindle 20. On the other hand, the tool 1 attached to the spindle 20 can be collected by the receiving tool holder 61 on table 12, and returned to the tool stocker 52 by the movement of the rotary arm 60.

Accordingly, even when the tool stocker 52 is disposed out of the range where the tip of the spindle 20 can reach, detachment and attachment of the tool 1 to the spindle 20 can be reliably performed by the tool handler 53.

In the exemplary embodiment, since the tool 1 is held by a pair of tool holding members (levers 611 to 622, 741 and 742), the tool 1 can be firmly held even if the tool 1 has a straight shank and/or the shank has a variety of diameters.

In the exemplary embodiment, since the rotary arm 60 is used as the holder transfer mechanism and is rotatable, a slide part can be decreased as compared with an instance where the holder transfer mechanism is linearly moved, thereby preventing occurrence of failure and the like caused by cut pieces in the slide part.

Support Mechanism 80

In the above-described machine tool 10 according to the exemplary embodiment, as shown in FIGS. 9 and 10, the receiving tool holder 61 and the supplying tool holder 62 (both of which are the tool holders) are provided to the rotary arm 60.

The support mechanism 80 according to the exemplary embodiment is used for supporting the receiving tool holder 61 and the supplying tool holder 62 on the rotary arm 60.

Figure 11:
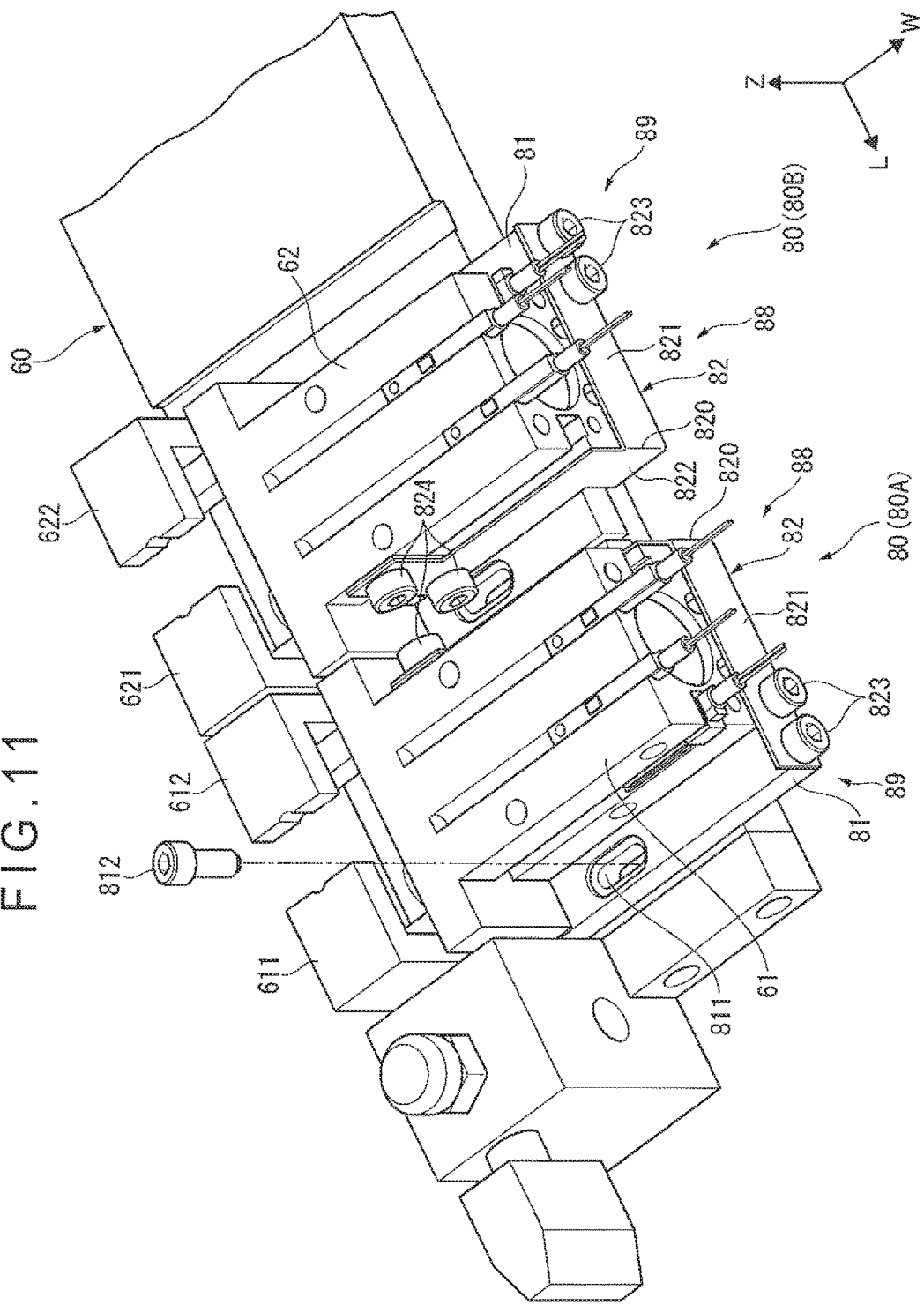
FIG. 11 is an enlarged rear-upper perspective view showing a support mechanism of the tool holder according to the exemplary embodiment.
Figure 12:
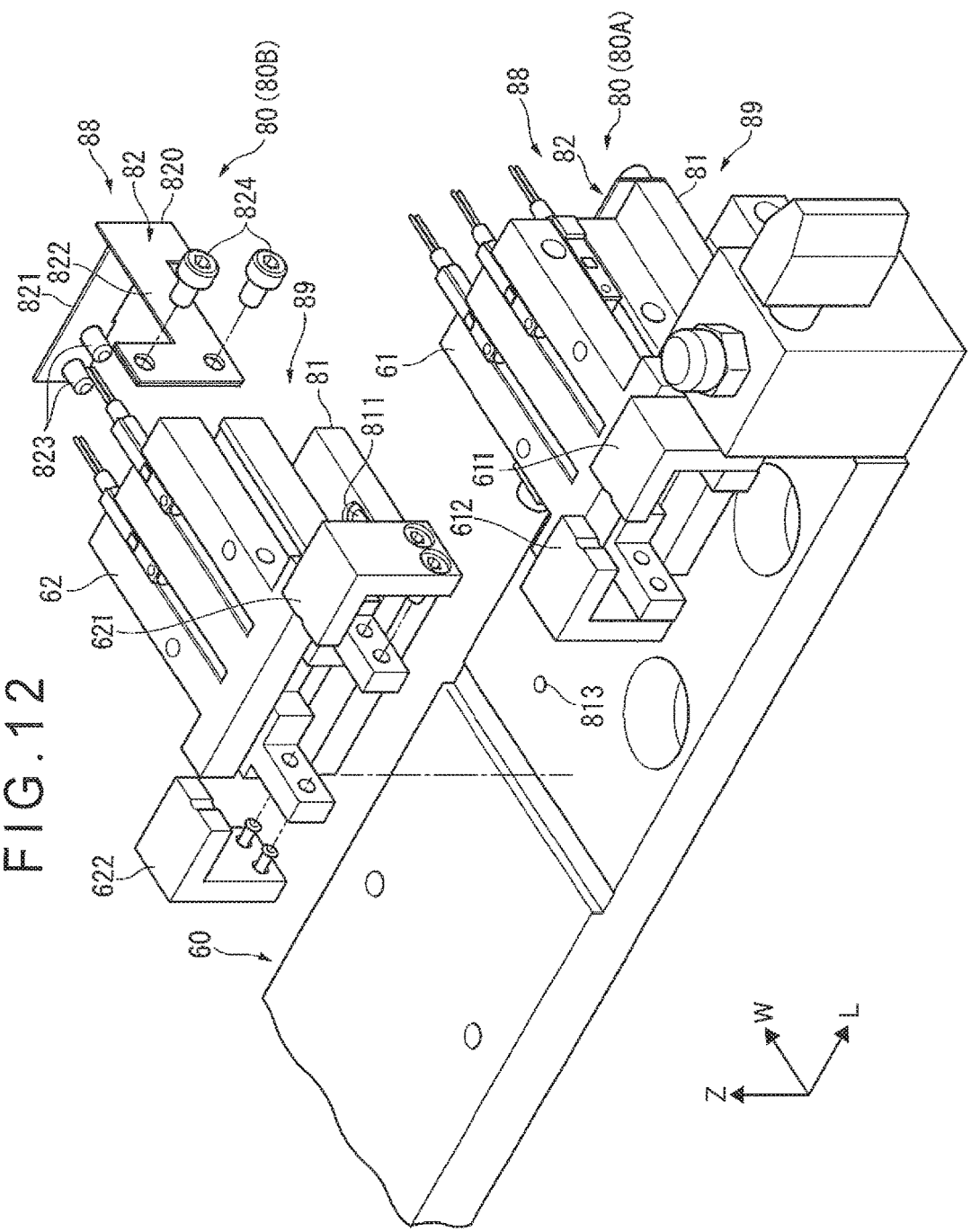
FIG. 12 is an enlarged exploded front-upper perspective view showing the support mechanism of the tool holder according to the exemplary embodiment.
Figure 13:
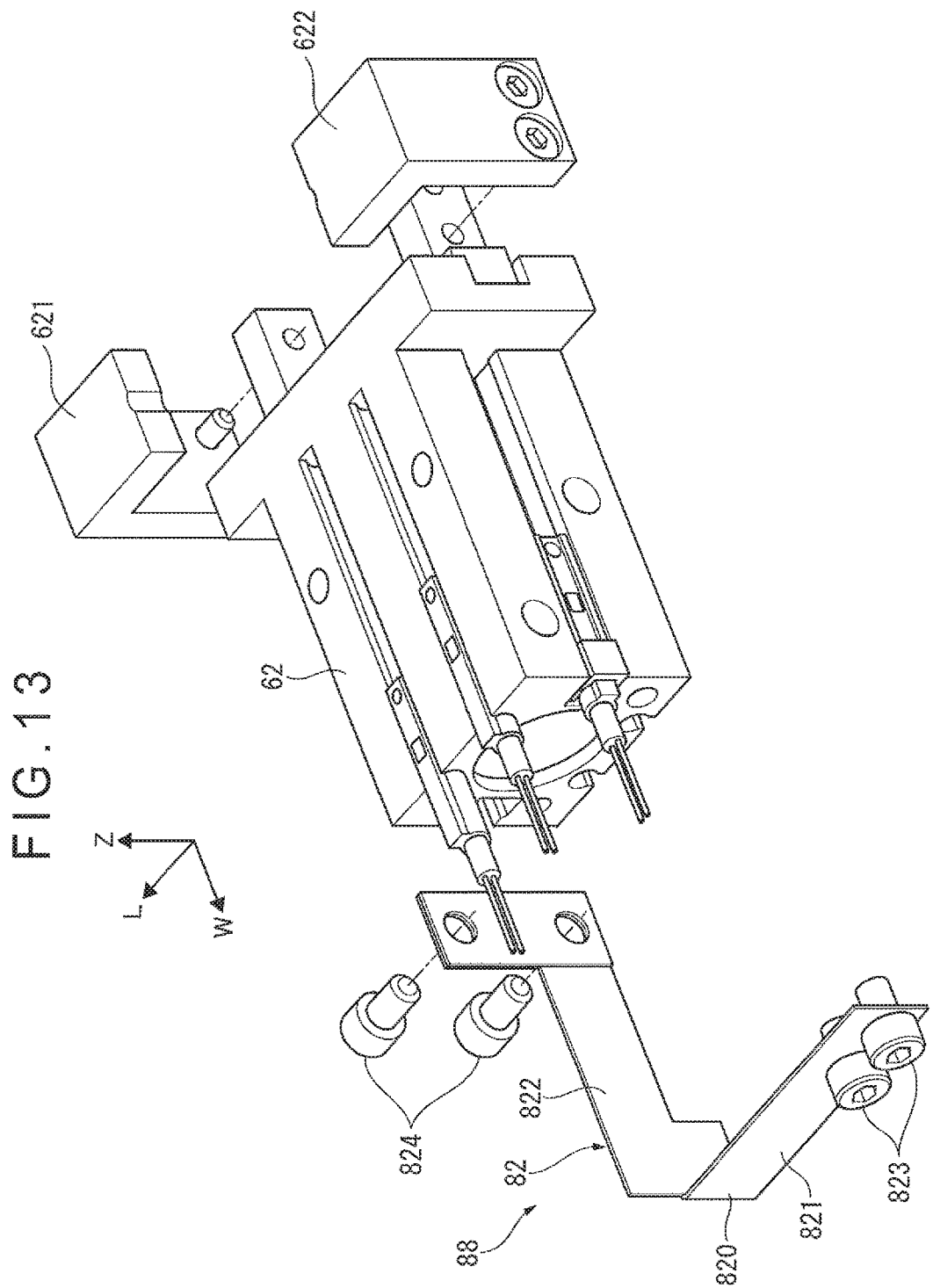
FIG. 13 is an enlarged exploded rear-upper perspective view showing the support mechanism of the tool holder according to the exemplary embodiment.

As shown in FIGS. 11, 12 and 13, the support mechanism 80 is provided for each of the receiving tool holder 61 and the supplying tool holder 62. A support mechanism 80A is provided for the receiving tool holder 61 and a support mechanism 80B is provided for the supplying tool holder 62. The support mechanism 80A and the support mechanism 80B have the same structure although in left-right opposing symmetry.

It should be noted that a longitudinal direction L of the rotary arm 60, a width direction W of the rotary arm 60 and an axis direction Z of the held tool 1 are defined as shown in FIGS. 9 to 13. The directions L, W and Z are mutually orthogonal. The rotary arm 60 moves by rotation in the width direction W in the support mechanism 80.

As shown in FIGS. 9 and 10, the support mechanism 80 includes an adjusting plate 81 interposed between a top surface of the rotary arm 60 and a lower surface of the receiving tool holder 61 or the supplying tool holder 62.

The adjusting plate 81 is a planarly rectangular metallic plate having a predetermined thickness and is fixed along the top surface of the rotary arm 60.

As shown in FIGS. 10, 11 and 12, the adjusting plate 81 have through holes 811 formed along both edges, the through holes 811 penetrating top and lower surfaces of the adjusting plate 81. Bolts 812 are respectively inserted in the through holes 811 to be screwed into screw holes 813 (see FIG. 12) formed on the top surface of the rotary arm 60. By fastening the bolts 812, the adjusting plate 81 is clamped to the rotary arm 60.

The through holes 811 are elongated holes respectively extending along both the edges of the adjusting plate 81. The adjusting plate 81 is disposed so that the extending direction of the through holes 811 is in the width direction W of the rotary arm 60.

Accordingly, by unfastening the fastened bolts 812, the bolts 812 are movable relative to the respective through holes 811 therein, so that a fixed position of the adjusting plate 81 can be displaced in the width direction W of the rotary arm 60.

As shown in FIGS. 10 and 11, the support mechanism 80 includes a bracket 82 connecting the adjusting plate 81 to the receiving tool holder 61 or the supplying tool holder 62.

As shown in FIGS. 12 and 13, the bracket 82 is a metallic bent plate having a substantially L-shaped plan.

The bracket 82 includes: a bent portion 820 in the middle; a first portion 821 on one side of the bent portion 820; and a second portion 822 on the other side thereof.

The first portion 821 is disposed along a rear surface of the adjusting plate 81 while extending in the longitudinal direction L of the rotary arm 60. A tip of the first portion 821 is fixed by a bolt 823 to the adjusting plate 81.

The second portion 822 is disposed along a side surface of the receiving tool holder 61 or the supplying tool holder 62 while extending in the width direction W of the rotary arm 60. A tip of the second portion 822 is fixed by a bolt 824 to the receiving tool holder 61 or the supplying tool holder 62.

In the first portion 821, a part fixed by the bolt 823 to the adjusting plate 81 is remote from the bent portion 820 by a predetermined distance. By elastic deformation of this part, the first portion 821 allows the bent portion 820 and the second portion 822 to be displaced relative to the adjusting plate 81 in the width direction W of the rotary arm 60.

In the second portion 822, a part fixed by the bolt 824 to the receiving tool holder 61 or the supplying tool holder 62 is remote from the bent portion 820 by a predetermined distance. By elastic deformation of this part, the second portion 822 allows the receiving tool holder 61 or the supplying tool holder 62 to be displaced relative to the bent portion 820 and the adjusting plate 81 in the longitudinal direction L of the rotary arm 60.

In the support mechanism 80, the first portion 821 is displaceable in the width direction W and the second portion 822 is displaceable in the longitudinal direction L. Accordingly, in the support mechanism 80, even if a support axis (in the Z direction) of the tool 1 in the receiving tool holder 61 or the supplying tool holder 62 is deviated in the width direction W and the longitudinal direction L from a support axis of the tool 1 in the chuck unit 40, such a deviation can be absorbed by the elastic deformation of the first portion 821 and the second portion 822.

In the support mechanism 80 according to the exemplary embodiment, the bracket 82 including the elastically deformable first portion 821 and second portion 822 defines a displacement following mechanism 88.

In the first portion 821 of the bracket 82, since the hole into which the bolt 823 is to be inserted is formed larger than a shank of the bolt 823, a fixed position of the bracket 82 to the adjusting plate 81 is adjustable in the longitudinal direction L of the rotary arm 60 by unfastening the bolt 823.

During the unfastened state of the bolt 823, the bracket 82 is rotatable around an axis in the width direction W of the rotary arm 60 relative to the adjusting plate 81, so that an inclination of the bracket 82 relative to the adjusting plate 81 is adjustable.

In the second portion 822 of the bracket 82, since the hole into which the bolt 824 is to be inserted is formed larger than a shank of the bolt 824, a fixed position of the bracket 82 to the receiving tool holder 61 or the supplying tool holder 62 is adjustable in the width direction W of the rotary arm 60 by unfastening the bolt 824.

During the unfastened state of the bolt 824, the bracket 82 is rotatable around an axis in the longitudinal direction L of the rotary arm 60 relative to the receiving tool holder 61 or the supplying tool holder 62, so that an inclination of the bracket 82 relative to the receiving tool holder 61 or the supplying tool holder 62 is adjustable.

Further, as described above, the fixed position of the adjusting plate 81 relative to the rotary arm 60 is adjustable in the width direction W by unfastening the bolts 812 inserted in the through holes 811.

Accordingly, during the unfastened state of the bolts 823, 824 and 812, the fixed positions of the receiving tool holder 61 and the supplying tool holder 62 relative to the rotary arm 60 are respectively adjustable in the width direction W and the longitudinal direction L.

In addition, during the unfastened state of the bolts 823, 824 and 812, the inclination is adjustable relative to three axes: an axis in the width direction W of the rotary arm 60; an axis in the longitudinal direction L of the rotary arm 60; and an axis in the Z direction (i.e., the support axis) of the tool 1.

In the support mechanism 80 according to the exemplary embodiment, the adjusting plate 81, the bracket 82 and the bolts 823, 824, 812 define a position adjusting mechanism 89.

Advantages of Support Mechanism 80

According to the support mechanism 80 in the exemplary embodiment, the following advantages are obtained.

In the exemplary embodiment, the receiving tool holder 61 and the supplying tool holder 62 can be fixed to the rotary arm 60 by the support mechanism 80.

At this time, since the displacement following mechanism 88 is defined in the support mechanism 80, even if axial misalignment occurs between the support axis (in the Z direction) of the tool 1 in the receiving tool holder 61 or the supplying tool holder 62 and the support axis of the tool 1 in the chuck unit 40, the axial misalignment can be absorbed.

In the exemplary embodiment, since the displacement following mechanism 88 is defined by the bracket 82 including the elastically deformable first portion 821 and second portion 822, the structure of the displacement following mechanism 88 can be simplified and the displacement following mechanism 88 allows the receiving tool holder 61 or the supplying tool holder 62 to smoothly follow the tool 1 supported by the chuck unit 40.

Accordingly, when the tool 1 is detached from and attached to the chuck unit 40, a deviated slide movement is not caused between the tool 1 and the collet member 43, so that lowering of the holding accuracy of the tool 1 in the chuck unit 40 can be dissolved.

Further, since the position adjusting mechanism 89 is defined in the support mechanism 80, the support axis of the tool 1 in the receiving tool holder 61 or the supplying tool holder 62 and the support axis of the tool 1 in the chuck unit

40 can be positionally adjusted so as to avoid the axial misalignment between the support axes.

Specifically, for instance, when the axial misalignment therebetween is constantly generated, such a constant axial misalignment can be dissolved by positionally adjusting the support axes using the position adjusting mechanism 89. The above-described follow-up movement caused by the displacement following mechanism 88 can be kept as much as a follow-up movement for adjusting an incidental axial misalignment every time the tool 1 is replaced, so that the tool 1 can be constantly smoothly replaced.

Further, in the position adjusting mechanism 89 according to the exemplary embodiment, in addition to the positional adjustment by parallel movement in the W direction and the L direction, an inclination of the receiving tool holder 61 or the supplying tool holder 62 relative to the rotary arm 60 is adjustable by rotation around two axes that are an axis in the W direction and an axis in the L direction, so that the support axis of the tool 1 (in the Z direction) and the support axis of the tool 1 in the chuck unit 40 can be aligned with a high accuracy.

Other Embodiment(s)

It should be understood that the invention is not limited to the above-described exemplary embodiment(s) but includes modifications and improvements as long as such modifications and improvements are compatible with the invention.

In the above exemplary embodiment, the receiving tool holder 61 or the supplying tool holder 62 is supported on the adjusting plate 81 through the bracket 82. Using the elastic deformation, the bracket 82 defines the displacement following mechanism 88. However, for instance, the receiving tool holder 61 or the supplying tool holder 62 may be suspended with four corners by coil springs or the like to be supported in a manner to be displaceable in the width direction W and the longitudinal direction L. Moreover, in addition to the elastic deformation of the mechanical members, a fluid pressure or a magnetic force may be used to support load by a repulsion force and absorb displacement.

In the above exemplary embodiment, the receiving tool holder 61 or the supplying tool holder 62 is supported on the rotary arm 60 through the adjusting plate 81. However, for instance, the bracket 82 may be directly connected to the rotary arm 60 without using the adjusting plate 81. In this arrangement, since an adjustable margin in the width direction W to be defined by the adjusting plate 81 is not obtainable, it is desirable that the bracket 82 can have an adjustment function as the position adjusting mechanism 89, for instance, by enlarging an adjustable margin of the bracket 82 by the same dimension as the adjustable margin of the adjusting plate 81.

In the above exemplary embodiment, both of the displacement following mechanism 88 and the position adjusting mechanism 89 are defined in the support mechanism 80. However, the position adjusting mechanism 89 may be omitted.

In the above exemplary embodiment, the tool stocker 52 shaped in a rectangular plate is used and, in the tool handler 5, the SCARA robot 70 is used for receiving and delivering the tool 1 from and to the rotary arm 60 (see FIG. 7).

However, a disc-shaped tool stocker may be used and a lift mechanism configured to lift up the tool 1 from the tool stocker in order to transfer the tool 1 between the tool handler 53 and the tool stocker may be used.

In the chuck unit 40 according to the exemplary embodiment, when the clamped tool 1 is released, another mechanism for releasing the pull-in force caused by the pull-in mechanism 48 may be used, or alternatively, another driving mechanism for moving the collet member 43 against the pull-in force caused by the pull-in mechanism 48 may be used. For instance, the collet member 43 can be driven by feeding a pressurized air through a coolant hole defined in the center hole 22 of the spindle 20.

It should be noted that the attachment accuracy of the tool 1 may be decreased when cut pieces adhere on an inner surface of the collet member 43. For this reason, before attaching the tool 1, a pressurized air may be blown to the inner surface of the collet member 43 to remove the cut pieces.

The squeezing mechanism 45 is defined not only by the conical surface but also by an inclined surface, the inclined surface being provided by surfaces of a plurality of equidistant projections circumferentially disposed on an outer circumferential surface of the collet member 43 or an inner surface of the chuck hole 42, the plurality of projections extending in the center axis C direction of the spindle 20, the surfaces being closer to the center axis C toward the innermost of the chuck hole 42.

The elastic pull-in member serving as the pull-in mechanism 48 is provided not only by the plurality of disc springs 47 but also by other elastic members such as a coil spring and a material for compressing a volume.

A component of rotatably supporting the spindle 20 on the spindle head 16 is not only the air bearing 32 but also other bearings as long as a predetermined accuracy and rotation speed are obtainable.

In the above exemplary embodiment, the chuck unit 40 is provided by a package including the collet member 43 housed in the sleeve member 41 having the chuck hole 42, the squeezing mechanism 45 and the pull-in mechanism 48. However, the squeezing mechanism 45 or the pull-in mechanism 48 may be unpackaged from the package and added to the spindle assembly 30. Alternatively, the chuck unit 40 may be unpackaged from the package, whereby the chuck hole 42 may be formed directly on the spindle body 21 and house the collet member 43 therein.

The receiving tool holder 61 and the supplying tool holder 62 may be movably provided on the rotary arm 60 without being fixed on the rotary arm 60. After detaching the tool 1 from the spindle 20, the substitution tool 1 can be attached without moving the spindle 20 by moving the receiving tool holder 61 and the supplying tool holder 62 in a manner to exchange the positions of the receiving tool holder 61 with the supplying tool holder 62 on the rotary arm 60.

The holder transfer mechanism is defined not only by the rotation as in the rotary arm 60 but also by a linear movement.

For instance, when a primary part of the machine tool 10 including the spindle 20 is covered with a dustproof cover and a primary part of each of the tool stocker 52 and the tool handler 53 is provided to an exterior of the dustproof cover, the dustproof cover requires a door or the like through which a tool holder side of the holder transfer mechanism moves in and out of the dustproof cover. A size of the door or the like can be minimized with the linear movement of the holder transfer mechanism.

What is claimed is:

1. A machine tool comprising:
  a spindle head;
  a spindle rotatably supported on the spindle head;
  a tool attachable to the spindle;
  a chuck unit provided to a tip of the spindle and configured to chuck the tool when the tool has been inserted in the chuck unit along a direction of a longitudinal center axis of the spindle;

a tool holder configured to hold the tool attached to the chuck unit;

a holder transfer mechanism configured to move the tool holder to a reachable position at which the tool holder is reachable by the spindle; and a support mechanism configured to support the tool holder on the holder transfer mechanism, wherein the support mechanism comprises a displacement following mechanism configured to support the tool holder on the holder transfer mechanism in a manner such that the tool holder is capable of displacement relative to the holder transfer mechanism in a first direction that is transverse relative to a longitudinal center axis of the tool, and in a second direction that is transverse relative to the longitudinal center axis of the tool and that is also transverse relative to the first direction, wherein the displacement following mechanism comprises a member having a first elastically deformable leg elastically deformable in the first direction, the member further having a second elastically deformable leg at an opposite end of the member from the first elastically deformable leg, the second elastically deformable leg being elastically deformable in the second direction.

2. The machine tool according to claim 1, wherein the member comprises an L-shaped bracket.

3. The machine tool according to claim 1, wherein the support mechanism comprises a position adjusting mechanism configured to enable a position of the tool holder to be adjusted relative to the holder transfer mechanism.

4. The machine tool according to claim 3, wherein the position adjusting mechanism comprises portions positionally adjustable in two directions that each intersect the axis of the tool and intersect each other.

\* \* \* \* \*